(12) United States Patent
Meyer et al.

(10) Patent No.: US 8,829,330 B2
(45) Date of Patent: Sep. 9, 2014

(54) HIGHLY EFFICIENT SOLAR ARRAYS

(75) Inventors: Dallas W. Meyer, Prior Lake, MN (US); Lowell J. Berg, Eden Prairie, MN (US); Lance E. Stover, Eden Prairie, MN (US); Orville D. Dodd, Minneapolis, MN (US); Thomas L. Murnan, Bloomington, MN (US)

(73) Assignee: Tenksolar, Inc., Minneapolis, MN (US)

( * ) Notice: Subject to any disclaimer, the term of this patent is extended or adjusted under 35 U.S.C. 154(b) by 0 days.

(21) Appl. No.: 13/207,164

(22) Filed: Aug. 10, 2011

(65) Prior Publication Data

US 2012/0204935 A1   Aug. 16, 2012

Related U.S. Application Data

(63) Continuation-in-part of application No. 12/711,040, filed on Feb. 23, 2010.
(Continued)

(51) Int. Cl.
| | | |
|---|---|---|
| *H01L 31/0296* | (2006.01) | |
| *H01L 31/04* | (2006.01) | |
| *H01L 31/0216* | (2006.01) | |
| *H01L 31/18* | (2006.01) | |
| *C23C 14/34* | (2006.01) | |
| *F24J 2/16* | (2006.01) | |
| *H01L 31/052* | (2014.01) | |
| *F24J 2/52* | (2006.01) | |
| *F24J 2/46* | (2006.01) | |
| *H01L 31/042* | (2014.01) | |
| *G02B 7/183* | (2006.01) | |
| *F24J 2/00* | (2014.01) | |

(52) U.S. Cl.
CPC .. *F24J 2/16* (2013.01); *Y02E 10/47* (2013.01); *H01L 31/0525* (2013.01); *F24J 2/5209* (2013.01); *F24J 2002/0084* (2013.01); *F24J 2/4636* (2013.01); *F24J 2/5239* (2013.01); *F24J 2/526* (2013.01); *F24J 2002/5226* (2013.01); *H01L 31/0422* (2013.01); *F24J 2002/5218* (2013.01); *Y02E 10/52* (2013.01); *F24J 2/5207* (2013.01); *F24J 2/4638* (2013.01); *F24J 2/5264* (2013.01); *G02B 7/183* (2013.01); *Y02B 10/20* (2013.01); *F24J 2/5254* (2013.01)
USPC ........... 136/246; 136/243; 136/244; 136/245; 136/247; 136/248; 136/249; 136/250; 136/251; 52/173.3

(58) Field of Classification Search
USPC ................................. 136/243–251; 52/173.3
See application file for complete search history.

(56) References Cited

U.S. PATENT DOCUMENTS 3,094,439 A   6/1963 Mann et al.
3,350,234 A   10/1967 Ule
(Continued)

FOREIGN PATENT DOCUMENTS

DE   3708548   9/1988
DE   4027325   4/1992
(Continued)

OTHER PUBLICATIONS

International Search Report dated Mar. 19, 2012 as received in application No. PCT/US2011/047291.
Written Opinion of the International Searching Authority Mar. 19, 2012 as received in application No. PCT/US2011/047291.
International Search Report and Written Opinion, mailed Sep. 27, 2010, as issued in connection with International Patent Application No. PCT/US2010/025108.
(Continued)

*Primary Examiner* — Matthew Martin
(74) *Attorney, Agent, or Firm* — Maschoff Brennan

(57) ABSTRACT

In an example, a solar energy system includes multiple PV modules, multiple reflectors, and a racking assembly. Each of the reflectors is positioned opposite a corresponding one of the PV modules. The racking assembly mechanically interconnects the PV modules and the reflectors to form an interconnected system. The racking assembly defines gaps within the racking assembly and between adjacent PV modules and reflectors. The interconnected system includes multiple contact points associated with the gaps. The gaps and contact points configure the interconnected system to accommodate surface unevenness of an installation surface up to a predetermined surface unevenness.

20 Claims, 17 Drawing Sheets

Related U.S. Application Data

(60) Provisional application No. 61/372,358, filed on Aug. 10, 2010, provisional application No. 61/392,862, filed on Oct. 13, 2010, provisional application No. 61/433,078, filed on Jan. 14, 2011, provisional application No. 61/478,806, filed on Apr. 25, 2011.

(56) References Cited

U.S. PATENT DOCUMENTS

| | | |
|---|---|---|
| 3,419,434 A | 12/1968 | Colehower |
| 3,833,426 A | 9/1974 | Mesch |
| 4,002,160 A | 1/1977 | Mather |
| 4,020,827 A | 5/1977 | Broberg |
| 4,033,327 A | 7/1977 | Pei |
| 4,120,282 A * | 10/1978 | Espy .............................. 126/684 |
| 4,154,998 A | 5/1979 | Luft et al. |
| 4,158,768 A | 6/1979 | Lavelli |
| 4,212,293 A | 7/1980 | Nugent |
| 4,227,298 A | 10/1980 | Keeling |
| 4,309,334 A | 1/1982 | Valitsky |
| 4,316,448 A | 2/1982 | Dodge |
| 4,321,416 A | 3/1982 | Tennant |
| 4,369,498 A | 1/1983 | Schulte |
| 4,410,757 A | 10/1983 | Stamminger et al. |
| 4,461,922 A | 7/1984 | Gay et al. |
| 4,481,378 A | 11/1984 | Lesk |
| 4,514,579 A | 4/1985 | Hanak |
| 4,604,494 A | 8/1986 | Shepard, Jr. |
| 4,611,090 A | 9/1986 | Catella |
| 4,617,421 A | 10/1986 | Nath |
| 4,695,788 A | 9/1987 | Marshall |
| 4,716,258 A | 12/1987 | Murtha |
| 4,747,699 A | 5/1988 | Kobayashi et al. |
| 4,755,921 A | 7/1988 | Nelson |
| 4,773,944 A | 9/1988 | Nath |
| 4,854,974 A | 8/1989 | Carlson |
| 4,933,022 A | 6/1990 | Swanson |
| 4,964,713 A | 10/1990 | Goetzberger |
| 4,966,631 A | 10/1990 | Matlin |
| 5,013,141 A | 5/1991 | Sakata |
| 5,021,099 A | 6/1991 | Kim |
| 5,048,194 A | 9/1991 | McMurtry |
| 5,096,505 A | 3/1992 | Fraas et al. |
| 5,205,739 A | 4/1993 | Malo |
| 5,246,782 A | 9/1993 | Kennedy |
| 5,268,037 A | 12/1993 | Glatfelter |
| 5,270,636 A | 12/1993 | Lafferty |
| 5,288,337 A | 2/1994 | Mitchell |
| 5,344,497 A | 9/1994 | Fraas |
| 5,374,317 A | 12/1994 | Lamb |
| 5,457,057 A | 10/1995 | Nath |
| 5,468,988 A | 11/1995 | Glatfelter |
| 5,478,402 A | 12/1995 | Hanoka |
| 5,491,040 A | 2/1996 | Chaloner-Gill |
| 5,493,096 A | 2/1996 | Koh |
| 5,505,789 A | 4/1996 | Fraas |
| 5,513,075 A | 4/1996 | Capper |
| 5,571,338 A | 11/1996 | Kadonome |
| 5,593,901 A | 1/1997 | Oswald |
| 5,719,758 A | 2/1998 | Nakata |
| 5,735,966 A | 4/1998 | Luch |
| 5,745,355 A | 4/1998 | Tracy et al. |
| 5,801,519 A | 9/1998 | Midya |
| 5,896,281 A | 4/1999 | Bingley |
| 5,910,738 A | 6/1999 | Shinohe |
| 5,982,157 A | 11/1999 | Wattenhofer |
| 5,990,413 A | 11/1999 | Ortabasi |
| 5,994,641 A | 11/1999 | Kardauskas |
| 6,011,215 A | 1/2000 | Glatfelter |
| 6,017,002 A | 1/2000 | Burke et al. |
| 6,043,425 A | 3/2000 | Assad |
| 6,077,722 A | 6/2000 | Jansen |
| 6,111,189 A | 8/2000 | Garvison |
| 6,111,454 A | 8/2000 | Shinohe |
| 6,111,767 A | 8/2000 | Handleman |
| 6,134,784 A | 10/2000 | Carrie |
| 6,177,627 B1 | 1/2001 | Murphy |
| 6,188,012 B1 | 2/2001 | Ralph |
| 6,201,180 B1 | 3/2001 | Meyer |
| 6,288,325 B1 | 9/2001 | Jansen |
| 6,294,723 B2 | 9/2001 | Uematsu |
| 6,331,208 B1 | 12/2001 | Nishida |
| 6,337,436 B1 | 1/2002 | Ganz |
| 6,339,538 B1 | 1/2002 | Handleman |
| 6,351,130 B1 | 2/2002 | Preiser |
| 6,462,265 B1 | 10/2002 | Sasaoka et al. |
| 6,465,724 B1 | 10/2002 | Garvison |
| 6,515,215 B1 | 2/2003 | Mimura |
| 6,528,716 B2 | 3/2003 | Collette |
| 6,706,963 B2 | 3/2004 | Gaudiana |
| 6,739,692 B2 | 5/2004 | Unosawa |
| 6,750,391 B2 | 6/2004 | Bower |
| 6,753,692 B2 | 6/2004 | Toyomura |
| 6,803,513 B2 | 10/2004 | Beernink |
| 6,858,461 B2 | 2/2005 | Oswald |
| 6,870,087 B1 | 3/2005 | Gallagher |
| 6,882,063 B2 | 4/2005 | Droppo |
| 6,903,261 B2 | 6/2005 | Habraken |
| 6,966,184 B2 | 11/2005 | Toyomura |
| 6,992,256 B1 | 1/2006 | Wiley |
| 7,009,412 B2 | 3/2006 | Chong |
| 7,094,441 B2 | 8/2006 | Chittibabu |
| 7,099,169 B2 | 8/2006 | West et al. |
| 7,138,730 B2 | 11/2006 | Lai |
| 7,205,626 B1 | 4/2007 | Nakata |
| 7,259,322 B2 | 8/2007 | Gronet |
| 7,276,724 B2 | 10/2007 | Sheats |
| 7,297,865 B2 | 11/2007 | Terao |
| 7,301,095 B2 | 11/2007 | Murphy |
| 7,336,004 B2 | 2/2008 | Lai |
| 7,339,108 B2 | 3/2008 | Tur |
| 7,342,171 B2 | 3/2008 | Khouri |
| 7,388,146 B2 | 6/2008 | Fraas |
| 7,432,438 B2 | 10/2008 | Rubin et al. |
| 7,498,508 B2 | 3/2009 | Rubin et al. |
| 7,997,938 B2 | 8/2011 | Costello et al. |
| 8,013,239 B2 | 9/2011 | Rubin et al. |
| 8,212,139 B2 | 7/2012 | Meyer |
| 2001/0008144 A1 | 7/2001 | Uematsu |
| 2002/0179140 A1 | 12/2002 | Toyomura |
| 2003/0047208 A1 | 3/2003 | Glenn et al. |
| 2003/0121228 A1 | 7/2003 | Stoehr |
| 2003/0121542 A1 | 7/2003 | Harneit et al. |
| 2003/0201007 A1 | 10/2003 | Fraas |
| 2004/0016454 A1 | 1/2004 | Murphy et al. |
| 2004/0055594 A1 | 3/2004 | Hochberg |
| 2004/0089337 A1 | 5/2004 | Chou |
| 2004/0261834 A1 | 12/2004 | Basore |
| 2004/0261955 A1 | 12/2004 | Shingleton et al. |
| 2005/0000562 A1 | 1/2005 | Kataoka et al. |
| 2005/0022857 A1 | 2/2005 | Daroczi |
| 2005/0034751 A1 | 2/2005 | Gross |
| 2005/0061360 A1 | 3/2005 | Horioka et al. |
| 2005/0081909 A1 | 4/2005 | Paull |
| 2005/0115176 A1 | 6/2005 | Russell |
| 2005/0121067 A1 | 6/2005 | Toyomura et al. |
| 2005/0133081 A1 | 6/2005 | Amato |
| 2005/0158891 A1 | 7/2005 | Barth |
| 2005/0172995 A1 | 8/2005 | Rohrig |
| 2005/0194939 A1 | 9/2005 | Duff, Jr. |
| 2005/0263179 A1 | 12/2005 | Gaudiana |
| 2005/0268959 A1 | 12/2005 | Aschenbrenner |
| 2005/0278076 A1 | 12/2005 | Barbir |
| 2006/0001406 A1 | 1/2006 | Matan |
| 2006/0042681 A1 | 3/2006 | Korman |
| 2006/0054212 A1 | 3/2006 | Fraas |
| 2006/0092588 A1 | 5/2006 | Realmuto et al. |
| 2006/0162772 A1 | 7/2006 | Presher, Jr. |
| 2006/0174931 A1* | 8/2006 | Mapes et al. .................. 136/251 |
| 2006/0174939 A1 | 8/2006 | Matan |
| 2006/0180197 A1 | 8/2006 | Gui |
| 2006/0185716 A1 | 8/2006 | Murozono |
| 2006/0185727 A1 | 8/2006 | Matan |
| 2006/0213548 A1 | 9/2006 | Bachrach |

(56) References Cited

U.S. PATENT DOCUMENTS

| | | | |
|---|---|---|---|
| 2006/0225777 | A1 | 10/2006 | Buechel |
| 2006/0235717 | A1 | 10/2006 | Sharma |
| 2006/0261830 | A1 | 11/2006 | Taylor |
| 2006/0266407 | A1 | 11/2006 | Lichey |
| 2007/0035864 | A1 | 2/2007 | Vasylyev |
| 2007/0056626 | A1 | 3/2007 | Funcell |
| 2007/0068567 | A1 | 3/2007 | Rubin et al. |
| 2007/0079861 | A1 | 4/2007 | Morali |
| 2007/0095384 | A1 | 5/2007 | Farquhar |
| 2007/0103108 | A1 | 5/2007 | Capp |
| 2007/0113885 | A1 | 5/2007 | Chan |
| 2007/0124619 | A1 | 5/2007 | Mizukami |
| 2007/0125415 | A1 | 6/2007 | Sachs |
| 2007/0144577 | A1 | 6/2007 | Rubin et al. |
| 2007/0151594 | A1 | 7/2007 | Mascolo et al. |
| 2007/0157964 | A1 | 7/2007 | Gronet |
| 2007/0186971 | A1 | 8/2007 | Lochun |
| 2007/0193620 | A1 | 8/2007 | Hines |
| 2007/0199588 | A1 | 8/2007 | Rubin et al. |
| 2007/0215195 | A1 | 9/2007 | Buller |
| 2007/0235077 | A1 | 10/2007 | Nagata |
| 2007/0240755 | A1 | 10/2007 | Lichy |
| 2007/0251569 | A1 | 11/2007 | Shan |
| 2007/0261731 | A1 | 11/2007 | Abe |
| 2007/0266672 | A1 | 11/2007 | Bateman |
| 2007/0272295 | A1 | 11/2007 | Rubin et al. |
| 2007/0273338 | A1 | 11/2007 | West |
| 2007/0295381 | A1 | 12/2007 | Fujii |
| 2008/0000516 | A1 | 1/2008 | Shifman |
| 2008/0029149 | A1 | 2/2008 | Simon |
| 2008/0029152 | A1 | 2/2008 | Milshtein |
| 2008/0037141 | A1 | 2/2008 | Tom |
| 2008/0092944 | A1 | 4/2008 | Rubin et al. |
| 2008/0142071 | A1 | 6/2008 | Dorn et al. |
| 2008/0163922 | A1 | 7/2008 | Horne et al. |
| 2008/0164766 | A1 | 7/2008 | Adest et al. |
| 2008/0210286 | A1 | 9/2008 | Ball |
| 2008/0290368 | A1 | 11/2008 | Rubin |
| 2008/0298051 | A1 | 12/2008 | Chu |
| 2009/0025778 | A1 | 1/2009 | Rubin et al. |
| 2009/0121968 | A1 | 5/2009 | Okamoto |
| 2009/0151775 | A1* | 6/2009 | Pietrzak ............ 136/251 |
| 2009/0183760 | A1 | 7/2009 | Meyer |
| 2009/0183763 | A1 | 7/2009 | Meyer |
| 2009/0183764 | A1 | 7/2009 | Meyer |
| 2009/0242021 | A1 | 10/2009 | Petkie et al. |
| 2009/0250093 | A1 | 10/2009 | Chen |
| 2010/0000165 | A1 | 1/2010 | Koller |
| 2010/0014738 | A1 | 1/2010 | Birnholz et al. |
| 2010/0089390 | A1 | 4/2010 | Miros et al. |
| 2010/0131108 | A1 | 5/2010 | Meyer |
| 2010/0212720 | A1 | 8/2010 | Meyer et al. |
| 2010/0282293 | A1 | 11/2010 | Meyer et al. |
| 2010/0313933 | A1* | 12/2010 | Xu ............ 136/246 |
| 2011/0039992 | A1 | 2/2011 | Irie |
| 2012/0204935 | A1 | 8/2012 | Meyer et al. |
| 2012/0234374 | A1 | 9/2012 | Meyer |

FOREIGN PATENT DOCUMENTS

| | | |
|---|---|---|
| DE | 20314372 | 12/2003 |
| DE | 102004001248 | 1/2005 |
| EP | 1724842 | 11/2006 |
| EP | 1744372 | 1/2007 |
| EP | 2 172 980 A1 | 4/2010 |
| EP | 2251941 | 11/2010 |
| GB | 2331530 | 5/1999 |
| JP | 60-141152 | 9/1985 |
| JP | 02-025079 | 1/1990 |
| JP | 09-045946 | 2/1997 |
| JP | 10-245935 | 9/1998 |
| JP | 10-281562 | 10/1998 |
| JP | 11-041832 | 2/1999 |
| JP | 11-103538 | 4/1999 |
| JP | 2000-114571 | 4/2000 |
| JP | 2000-213255 | 8/2000 |
| JP | 2001-268891 | 9/2001 |
| JP | 2002-073184 | 3/2002 |
| JP | 2002-305318 | 10/2002 |
| JP | 2003-026455 | 1/2003 |
| JP | 2007-234795 | 9/2007 |
| JP | 2007-294630 | 11/2007 |
| JP | 2009-503870 | 1/2009 |
| KR | 10-1998-087002 | 12/1998 |
| KR | 10-2007-0104300 | 10/2007 |
| KR | 10-2007-0107318 | 11/2007 |
| TW | 201042770 | 12/2010 |
| TW | 201106490 | 12/2011 |
| WO | WO 02/35613 | 2/2002 |
| WO | 2004/021455 | 3/2004 |
| WO | 2007/071064 | 6/2007 |
| WO | 2007/095757 | 8/2007 |
| WO | 2007/137407 | 12/2007 |
| WO | WO 2008/016453 | 2/2008 |
| WO | 2008/028677 | 3/2008 |
| WO | 2008/042828 | 4/2008 |
| WO | 2008/046201 | 4/2008 |
| WO | 2008/141415 | 11/2008 |
| WO | 2009/012567 | 1/2009 |
| WO | 2009/076740 | 6/2009 |
| WO | WO 2009/09211 | 7/2009 |
| WO | 2010/012062 | 2/2010 |
| WO | 2010/037393 | 4/2010 |
| WO | 2010/096833 | 8/2010 |
| WO | 2010/148009 | 12/2010 |
| WO | 2011/011855 | 2/2011 |
| WO | 2011/109741 | 9/2011 |

OTHER PUBLICATIONS

International Search Report and Written Opinion, mailed Sep. 29, 2009, as issued in connection with International Patent Application No. PCT/US2009/031597.
International Search Report and Written Opinion, mailed Aug. 31, 2011, as issued in connection with International Patent Application No. PCT/US2010/061864.
International Search Report and Written Opinion, mailed Dec. 29, 2011, as issued in connection with International Patent Application No. PCT/US2010/038702.
Supplementary European Search Report date Jun. 13, 2013 as received in European Application No. EP 09702762.
Japanese Office Action dated Feb. 19, 2013 in Japanese Application No. 2011-551303.
Zeghbroeack, Bart V., Ellipsometer Data Table, http://ece-www.colorado.edu/~bart/book/ellipstb.htm, 1997.
Supplemental European Search Report date May 2, 2013 as received in European Application No. 10790069.8.
Japanese Office Action date Apr. 30, 2013 in Japanese Application No. 2012-516209.
Solatron Technologies, Wiring Solar Modules and Batteries, <http://web.archive.org/web/20030206212224/http://partsonsale.com/learnwiring.htm>, web archived May 2008.
U.S. Appl. No. 12/357,268, Nov. 29, 2011, Restriction Requirement.
U.S. Appl. No. 12/357,268, Feb. 3, 2012, Restriction Requirement.
U.S. Appl. No. 12/357,268, Aug. 2, 2012, Office Action.
U.S. Appl. No. 12/357,268, Nov. 21, 2012, Office Action.
U.S. Appl. No. 12/684,595, Jan. 25, 2012, Restriction Requirement.
U.S. Appl. No. 12/684,595, Mar. 16, 2012, Notice of Allowance.
U.S. Appl. No. 12/357,260, Aug. 2, 2012, Restriction Requirement.
U.S. Appl. No. 12/357,260, Feb. 5, 2013, Office Action.
U.S. Appl. No. 12/357,260, May 23, 2013, Office Action.
U.S. Appl. No. 12/357,277, Jan. 26, 2012, Office Action.
U.S. Appl. No. 12/357,277, Jul. 19, 2012, Office Action.
U.S. Appl. No. 12/711,040, Jun. 18, 2012, Restriction Requirement.
U.S. Appl. No. 12/711,040, Nov. 26, 2012, Office Action.
U.S. Appl. No. 12/711,040, Jul. 5, 2013, Office Action.
U.S. Appl. No. 12/815,913, May 29, 2012, Restriction Requirement.
U.S. Appl. No. 12/815,913, Oct. 5, 2012, Office Action.

* cited by examiner

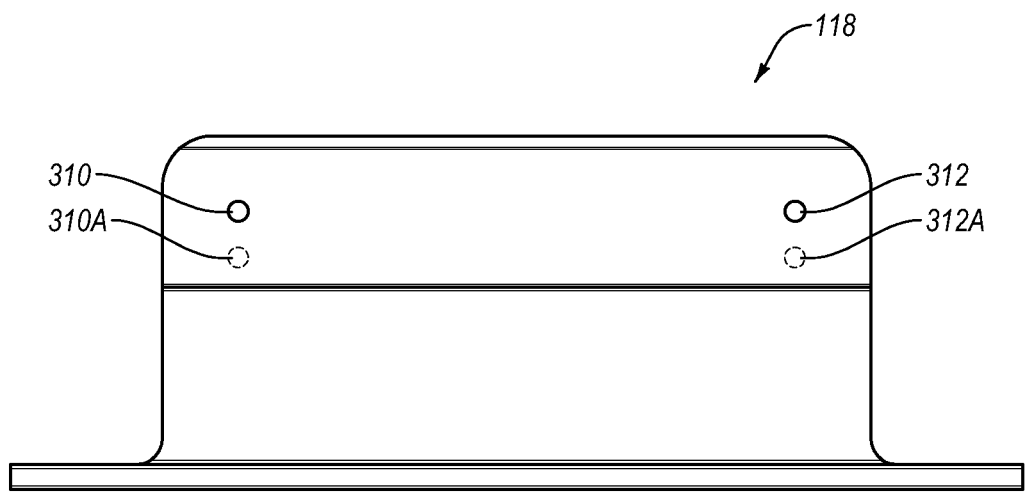
Fig. 3B
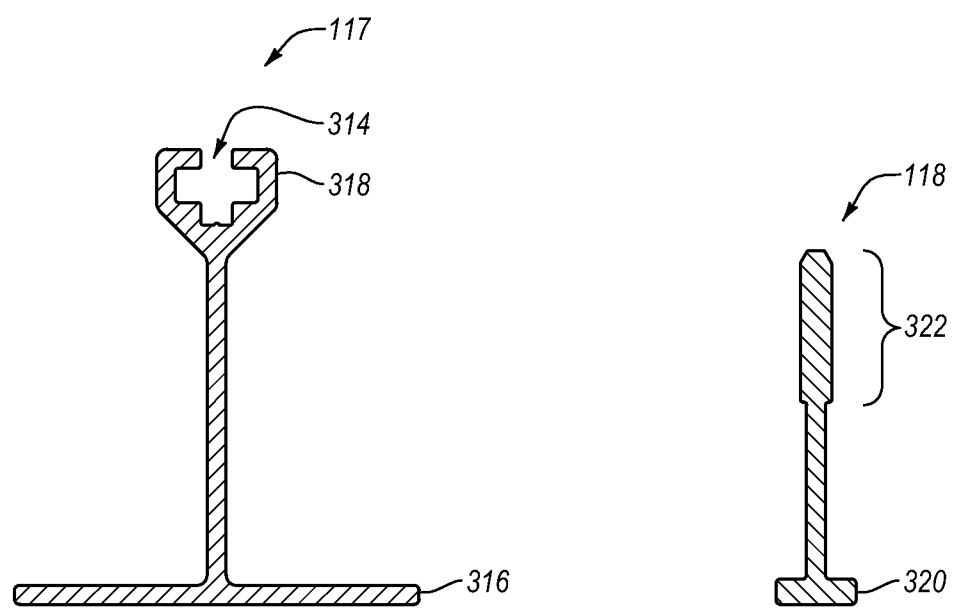
Fig. 3C
Fig. 3D

HIGHLY EFFICIENT SOLAR ARRAYS

CROSS-REFERENCE TO RELATED APPLICATIONS

This application is a continuation-in-part of U.S. patent application Ser. No. 12/711,040, filed on Feb. 23, 2010.

This application also claims the benefit of and priority to the following:

U.S. Provisional Patent Application No. 61/372,358, filed on Aug. 10, 2010;

U.S. Provisional Patent Application No. 61/392,862, filed on Oct. 13, 2010;

U.S. Provisional Patent Application No. 61/433,078, filed on Jan. 14, 2011; and

U.S. Provisional Patent Application No. 61/478,806, filed on Apr. 25, 2011.

Each of the five foregoing patent applications is herein incorporated by reference in its entirety.

BACKGROUND

1. Field of the Invention

The present invention generally relates to solar energy. More particularly, some example embodiments relate to a solar energy system including multiple photovoltaic (PV) modules and reflectors.

2. Related Technology

Reducing the cost of solar energy is critical to ensure it reaches a level of competitiveness with fossil fuels and other conventional energy generation methods. Many approaches are being pursued to increase the efficiency of the PV material implemented within PV modules and thereby decrease its cost. This includes high magnification non-focusing devices and lower magnification concentrators. Both generally use single or dual axis tracking systems to maintain alignment, and both require complex shaping and forming of optical elements to reflect the light onto the PV modules.

Flat large area reflectors can also be used by reflecting light onto a flat plat PV module. This approach is not suitable for conventional PV modules which include series-connected PV cells that limit the ability of the PV module to realize any power gain under non-uniform lighting conditions. Additionally, the reflectors have to be carefully positioned and/or designed to avoid creating optical hazards, such as potentially blinding reflections and/or concentration of reflected light on remote and potentially combustible objects.

In addition, some commercial applications involve the installation of an array of PV modules and/or reflectors on a roof of a building or other pre-existing structure, or on the ground. In latitudes greater than 20 degrees, the PV modules require some level of orientation towards the sun to achieve optimum performance. In addition, because the PV modules cannot tolerate non-uniform illumination such as shading from adjacent PV modules, the PV modules have to be relatively widely spaced between rows to ensure no shading takes place from adjacent rows throughout the year.

Further, wind loading behind the PV modules at the installation location can tip, move, or otherwise damage the PV modules unless the PV modules are secured in some fashion. Typical solutions involve added ballast such as concrete blocks or structural penetrations used to anchor the PV modules to the structure on which they have been installed. Alternately, for ground-mounted arrays, piles are driven into the ground and the arrays are secured to the piles. These solutions add costs, and in the case of roof mounts, decrease the serviceable life of the building and the number of modules that can be placed on the roof due to weight limitations.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

Example embodiments described herein relate to a solar energy system including multiple PV modules and reflectors.

In an example embodiment, a solar energy system includes multiple PV modules, multiple reflectors, and a racking assembly. Each of the reflectors is positioned opposite a corresponding one of the PV modules. The racking assembly mechanically interconnects the PV modules and the reflectors to form an interconnected system. The racking assembly defines gaps within the racking assembly and between adjacent PV modules and reflectors. The interconnected system includes multiple contact points associated with the gaps. The gaps and contact points configure the interconnected system to accommodate surface unevenness of an installation surface up to a predetermined surface unevenness.

In another example embodiment, a reflector configured to be implemented in a solar energy system includes a reflective sheet and a frame. The reflective sheet is configured to reflect light having wavelengths within a reflectance spectrum of the reflective sheet. The frame supports the reflective sheet and includes two side members positioned at opposing sides of the reflective sheet. Each side member has a length greater than a length of the reflective sheet and is arranged such that top and bottom portions of the side member respectively extend beyond upper and lower ends of the reflective sheet. Each side member has a double-wall-box construction including an inner box connected lengthwise side-by-side with an outer box along at least most of the length of each side member, one side of each box being a common wall shared between the inner and outer boxes that separates the inner box from the outer box.

In yet another example embodiment, a solar energy system includes PV mole and a rod. The PV module includes a frame along a perimeter of the PV module. The frame includes two side members positioned on opposing sides of the PV module. Each side member has a top end and a bottom end that respectively extend beyond a top edge and a bottom edge of the PV module. Each side member has a single-wall-box construction. The rod is received through a slot in the top end of each of the two side members, the rod being coupled to a vertical installation surface and coupling the PV module to the vertical installation surface.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 3B is an elevation view of a fin included in the racking assembly of FIG. 3A;

FIG. 3C is a cross-sectional view of a rail included in the racking assembly of FIG. 3A in a cutting plane 3C illustrated in FIG. 3A;

FIG. 3D is a cross-sectional view of the fin included in the racking assembly of FIG. 3A in a cutting plane 3D illustrated in FIG. 3A;

DETAILED DESCRIPTION OF SOME EXAMPLE EMBODIMENTS

Some embodiments described herein generally relate to solar energy systems including illumination agnostic photovoltaic (PV) modules and opposing discrete reflectors arranged in an array. As used herein, the term "illumination agnostic" indicates insensitivity of the PV modules to non-uniform illumination conditions. Embodiments of a solar energy system may provide natural lighting beneath the system and/or rainwater collection. Alternately or additionally, components of the solar energy system may be seasonally adjusted to enhance annual energy production. The solar energy system may include a racking assembly that interconnects and stabilizes the components of the system. Optionally, the racking assembly may cooperate with the PV modules and/or the reflectors to provide a non-linear compliance profile.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

Figure 1:
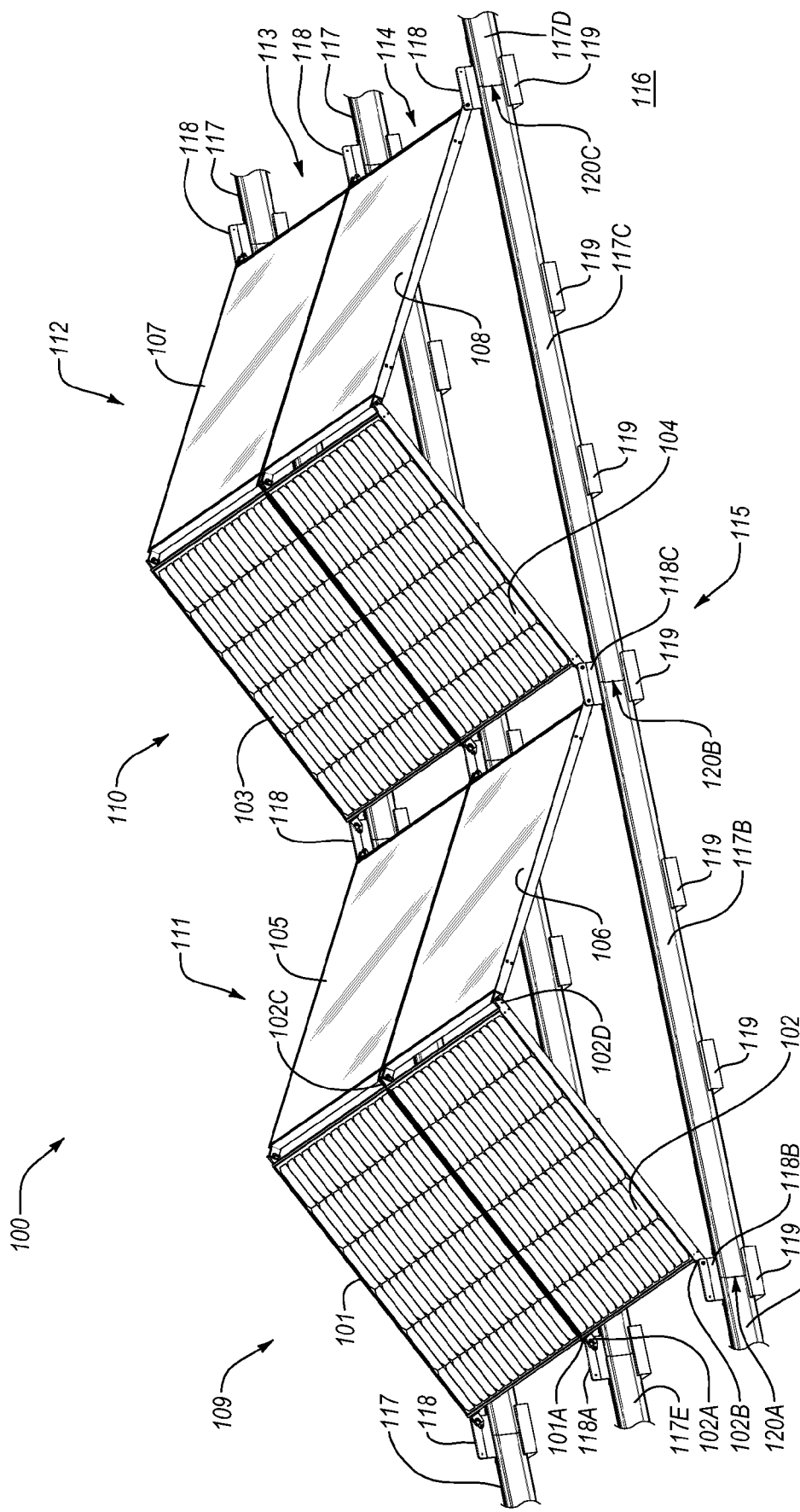
FIG. 1 is a perspective view of an example solar energy system.

Turning first to FIG. 1, a perspective view of an example solar energy system 100 according to some embodiments is illustrated. The solar energy system 100 includes a plurality of PV modules 101-104 and a plurality of reflectors 105-108. In general, each of the reflector 105-108 may be positioned opposite a corresponding one of the PV modules 101-104. Specifically, the reflectors 105 and 106 are positioned opposite the PV modules 103 and 104, respectively; the solar energy system 100 may include other reflectors (not shown) positioned opposite the PV modules 101 and 102.

In the illustrated embodiment, the PV modules 101-104 are arranged in multiple module rows 109, 110 and the reflectors 105-108 are arranged in multiple reflector rows 111, 112. While two module rows 109, 110 and two reflector rows 111, 112 are illustrated in FIG. 1, more generally the solar energy system 100 may include any number of module rows and reflector rows.

The PV modules 101-104 and the reflectors 105-108 may be logically grouped into module-reflector columns 113, 114 in a direction orthogonal to the module rows 109, 110 and the reflector rows 111, 112. Each module-reflector column 113, 114 includes multiple pairs of a PV module 101, 102, 103 or 104 with a reflector 105, 106, 107 or 108, respectively.

The solar energy system 100 further includes a racking assembly 115 that mechanically interconnects the PV modules 101-104 and the reflectors 105-108 to form an interconnected system. As will be explained in greater detail below, the racking assembly 115 may define gaps within the racking assembly 115 and/or between adjacent PV modules 101-104 and/or reflectors 105-108. The interconnected system includes contact points associated with the gaps. The gaps and contact points may configure the interconnected system to accommodate surface unevenness of an installation surface 116, such as a roof, up to a predetermined surface unevenness. The predetermined surface unevenness may be about one quarter of an inch per linear foot. In other embodiments, the predetermined surface unevenness may be more or less than one quarter of an inch per linear foot. For instance, the predetermined surface unevenness may be in a range from one eighth of an inch per linear foot to one half of an inch per linear foot.

Figure 2:
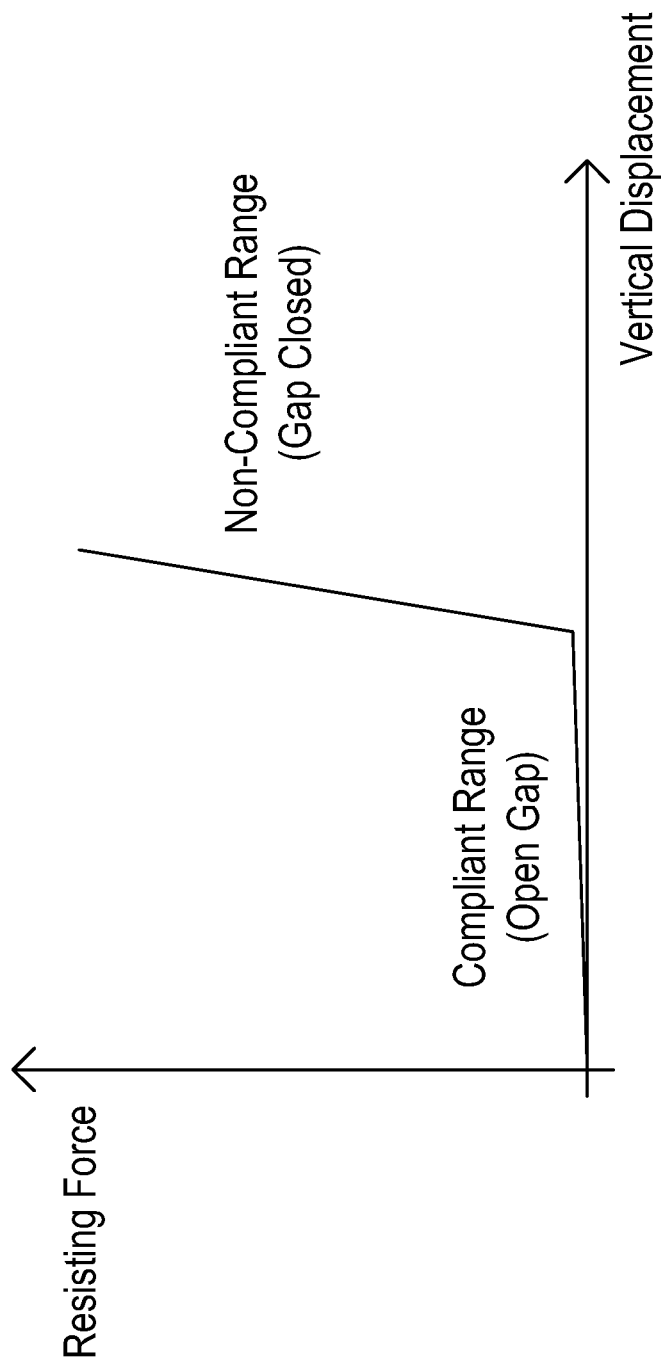
FIG. 2 is an example force versus displacement profile for the solar energy system of FIG. 1.

Moreover, the foregoing configuration of the solar energy system 100 may result in a non-linear force versus displacement profile, such as the force versus displacement profile illustrated in FIG. 2. In particular, FIG. 2 illustrates an example of the resisting force of the solar energy system 100 as a function of vertical displacements in a direction orthogonal to the installation surface. In this example, the slope of the force versus displacement profile may correspond to the stiffness of the solar energy system 100. As shown in FIG. 2, the solar energy system 100 may have a compliant range with relatively low stiffness (e.g., low slope) for displacements in a direction orthogonal to the installation surface 116 up to a predetermined threshold, and a non-compliant range with sharply increasing stiffness (e.g., high slope) for displacements greater than the predetermined threshold. The predetermined threshold may correspond to a displacement of a component (or components) relative to another component (or components) that causes a gap (or gaps) to at least partially close and the contact points associated with that gap (or gaps) to come in contact with each other. Until a gap has been closed, components on either side of the gap can move relative to each other with little resistance; however, after a gap has been closed and the associated contact points are in contact with each other, the stiffness of the individual components prevents (or at least significantly inhibits) further movement.

Returning to FIG. 1, the racking assembly 115 in the illustrated embodiment includes multiple rails 117, including rails 117A-117E, and multiple fins 118, including fins 118A-118C. The rails 117 are arranged orthogonally to and beneath the module rows 109, 110 and reflector rows 111, 112. The fins 118 interconnect the PV modules 101-104 and reflectors 105-108 to the rails 117. Optionally, the racking assembly 115 may further include multiple compliant pads 119, each compliant pad 119 being positioned between one or more of the rails 117 and the installation surface 116.

As seen in FIG. 1, the PV modules 101-104 and the reflectors 105-108 each have a generally rectangular shape. Moreover, the PV modules 101-104 may all generally have the same dimensions, the reflectors 105-108 may all generally have the same dimensions, but the dimensions of the PV modules 101-104 may not necessarily be the same as the dimensions of the reflectors 105-108. Whereas the PV modules 101-104 and the reflectors 105-108 are generally rectangular, each includes four corners, including two lower corners and two upper corners. Each lower corner is connected to the racking assembly 115 through a corresponding fin 118 and each upper corner is connected to an upper corner of a PV module or reflector immediately therebehind. Adjacent lower corners of adjacent PV modules 101-104 within each module row 109, 110 and of adjacent reflectors 105-108 within each reflector row 111, 112 are connected to each other through a corresponding one of the fins.

For example, the PV module 102 includes lower corners 102A, 102B and upper corners 102C, 102D. The lower corners 102A, 102B of the PV module 102 connect to the racking assembly 115 through, respectively, the fin 118A and the fin 118B. The upper corner 102C is connected to a corresponding upper corner of the reflector 106 immediately behind the PV module 102, as is the upper corner 102D. Moreover, the PV module 102 is adjacent to the PV module 101. The lower corner 102A of the PV module 102 is adjacent to a lower corner 101A of the PV module 101, and the lower corners 102A, 101A are connected to each other through the fin 118A.

The rails 117 are arranged in rail columns orthogonal to the module rows 109, 110 and reflector rows 111, 112. Each rail column includes one or more rails 117. In rail columns that include multiple rails 117, the rails 117 of the rail column are longitudinally aligned and connected end-to-end to each other. For instance, one rail column illustrated in FIG. 1 includes the rails 117A-117D where the rails 117A-117D are longitudinally aligned, with the rails 117A and 117B connected end-to-end, the rails 117B and 117C connected end-to-end, and the rails 117C and 117D connected end-to-end. Accordingly, each rail 117 may have a length in a range between 50 to 100 inches, or in a range from 75 to 80 inches. Alternately, the rails 117 may each have a length of less than 50 inches or greater than 100 inches.

In other embodiments, each rail 117 has a length in a range between fifteen to thirty feet. In these and other embodiments, a length of each rail 117 in terms of module-reflector pairs in a module-reflector column 113-114 may be in a range between two to four module-reflector pairs in length.

In some embodiments, the racking assembly 115 defines a rail-to-rail gap between adjacent longitudinally-connected rails, where the ends of the adjacent longitudinally-connected rails on opposing sides of the rail-to-rail gap include contact points associated with the rail-to-rail gap. For instance, one rail-to-rail gap 120A is defined between the rails 117A, 117B, and another rail-to-rail gap 120B is defined between the rails 117B, 117C. The ends of the rails 117A, 117B on opposing sides of the rail-to-rail gap 120A include contact points (not labeled) associated with the rail-to-rail gap 120A, while the ends of the rails 117B, 117C on opposing sides of the rail-to-rail gap 120B include contact points (not labeled) associated with the rail-to-rail gap 120B. Rail-to-rail gaps and associated contact points in the racking assembly 115, such as the rail-to-rail gaps 120A, 120B and associated contact points, are examples of the gaps and associated contact points that may configure the solar energy system 100 with a non-linear force versus displacement profile, such as that illustrated in FIG. 2.

I. Racking Assembly

Figure 3A:
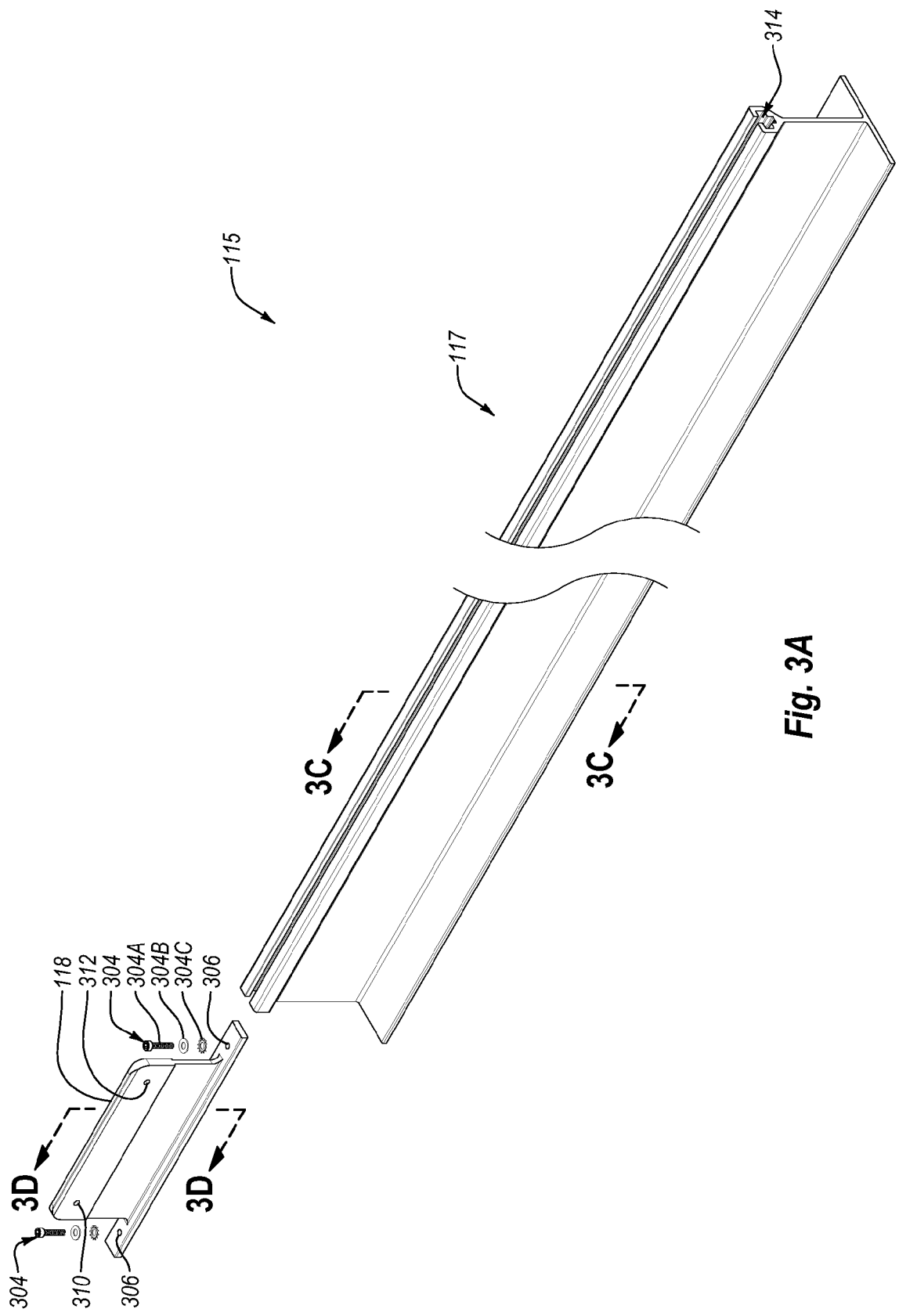
FIG. 3A is an exploded perspective view of a portion of a racking assembly included in the solar energy system of FIG. 1.

Turning next to FIGS. 3A-3D, additional aspects of the racking assembly 115 are disclosed. FIG. 3A is an exploded perspective view of a portion of the racking assembly 115, including one of the rails 117 and one of the fins 118 of FIG. 1. In the illustrated embodiment, the fin 118 is used to interconnect the rail 117 with another longitudinally aligned rail 117 (not shown in FIG. 3A). In general, the racking assembly 115 includes a fin 118 at each location where two longitudinally aligned and adjacent rails 117 are connected end-to-end. In other embodiments, the fin 118 may be positioned along the rail 117 away from the ends of the rail 117, and a separate connector (not shown) may be provided at each end of the rail 117 to interconnect with other longitudinally aligned rails 117, as disclosed in the application Ser. No. 12/711,040 previously incorporated by reference.

In the example of FIG. 3A, two fastener assemblies 304 may be provided for attaching the fin 118 to the rail 117. Each fastener assembly 304 may include, but is not limited to, a threaded fastener 304A, a flat washer 304B and a star washer 304C. In the illustrated embodiment, each of the threaded fasteners 304A is received into a corresponding threaded hole 306 formed in the fin 118 to secure the fin 118 to the rail 117 as will be described in more detail below. In other embodiments, through holes are provided in the fin 118 rather than threaded holes 306.

The fins 118 can be attached to the rails 117 at any desired longitudinal position along the rails 117 unless the fins 118 are used to interconnect the rails 117, in which case a fin 118 may be provided at the ends of the rails for interconnecting the rails. Further, each fin 118 may include two threaded holes 310, 312, as best seen in FIG. 3B. In other embodiments, through holes or holes for pressed in studs are provided in the fin 118 rather than threaded holes 310, 312. One of the threaded holes 310, 312, e.g., threaded hole 310, is configured to receive a fastener such as a bolt (or a screw, pressed in stud, pin, or the like) for securing a lower corner of a reflector to the fin 118. Alternately, the threaded hole 310 is configured to receive a fastener for securing two adjacent lower corners, one each from two adjacent reflectors, to the fin 118. The other threaded hole 312 is configured to receive a fastener for securing one or two lower corners of one or two adjacent PV modules, e.g., the lower corners 101A, 102A of PV module 101 and 102, to the fin 118A in FIG. 1, for instance.

FIG. 3B is an elevation view of the fin 118 of FIG. 3A. In the illustrated embodiment of FIG. 3B, the two threaded holes 310, 312 are disposed at approximately the same height on the fin 118. Alternately or additionally, the two threaded holes 310, 312 may be disposed at different heights. Alternately or additionally, the fin 118 includes a plurality of additional threaded holes 310A and/or 312A disposed at different heights along the fin 118. Although not shown, the fin 118 may optionally further include additional holes disposed at different longitudinal positions, and/or slots. The additional threaded holes 310A and 312A, any additional longitudinally-disposed holes, and/or any slots in the fin 118 may permit the PV modules 101-104 and/or the reflectors 105-108 to attach to the fin 118 at a variety of positions, allowing for some flexibility in installation angles of the PV modules 101-104 and the reflectors 105-108.

It will be appreciated, with the benefit of the present disclosure, that some installation locations, such as roofs, are not perfectly planar and have variable slopes. Accordingly, in some embodiments, the interconnects 302 have sufficient compliance to allow longitudinally adjacent rails 117, such as rails 117A and 117B (FIG. 1), to conform to different slopes or surface unevenness by allowing the longitudinally adjacent rails 117 to be vertically displaced and/or rotated in- or out-of-plane relative to one another so long as the corresponding rail-to-rail gap, such as rail-to-rail gap 120A (FIG. 1) remains open, while maintaining the mechanical and electrical connection between the longitudinally adjacent rails 117.

In some examples, the racking assembly 115 of the solar energy system 100 of FIG. 1 provides an electrical ground for all of the PV modules 101-104. As such, the rails 117, the fins 118, and/or the fastener assemblies 304 are made of conductive metal or other conductive materials in some embodiments. Alternately or additionally, the racking assembly 115 employs locking, star or other washers, e.g., in the fastener assemblies 304, to maintain electrical continuity.

For mechanical support in the fin 118-to-rail 117 connections, each of the rails 117 may include a longitudinal channel formed along its top, such as the longitudinal channel 314 illustrated in FIG. 3A. As will be described in greater detail with respect to FIGS. 3C-3D, the channel 314 is shaped to laterally confine the fins 118 within the channel 314.

FIG. 3C is a cross-sectional view of the rail 117 in cutting plane 3C illustrated in FIG. 3A. The cross-sectional view of the rail 117 is in a plane normal to the length of the rail 117. In the illustrated embodiment, the rail 117 has a substantially upside-down T-shaped cross-section, and includes a base 316 and top 318. The base 316 is configured to rest on an installation surface (or on compliant pads resting on the installation surface) and support the rest of the solar energy system 100 (FIG. 1) above the installation surface. The top 318 of the rail 117 defines the longitudinal channel 314, which is formed therein. In some embodiments, the rail 117 is continuously extruded.

FIG. 3D is a cross-sectional view of the fin 118 in cutting plane 3D illustrated in FIG. 3A. The cross-sectional view of the fin 118 is in a plane normal to the length of the fin 118. In the illustrated embodiment, the fin 118 has a substantially upside-down T-shaped cross-section and includes a base 320 and a top portion 322. The base 320 has a cross-sectional shape that allows the base 320 to be received within the channel 314, as further described below.

Figure 4A:
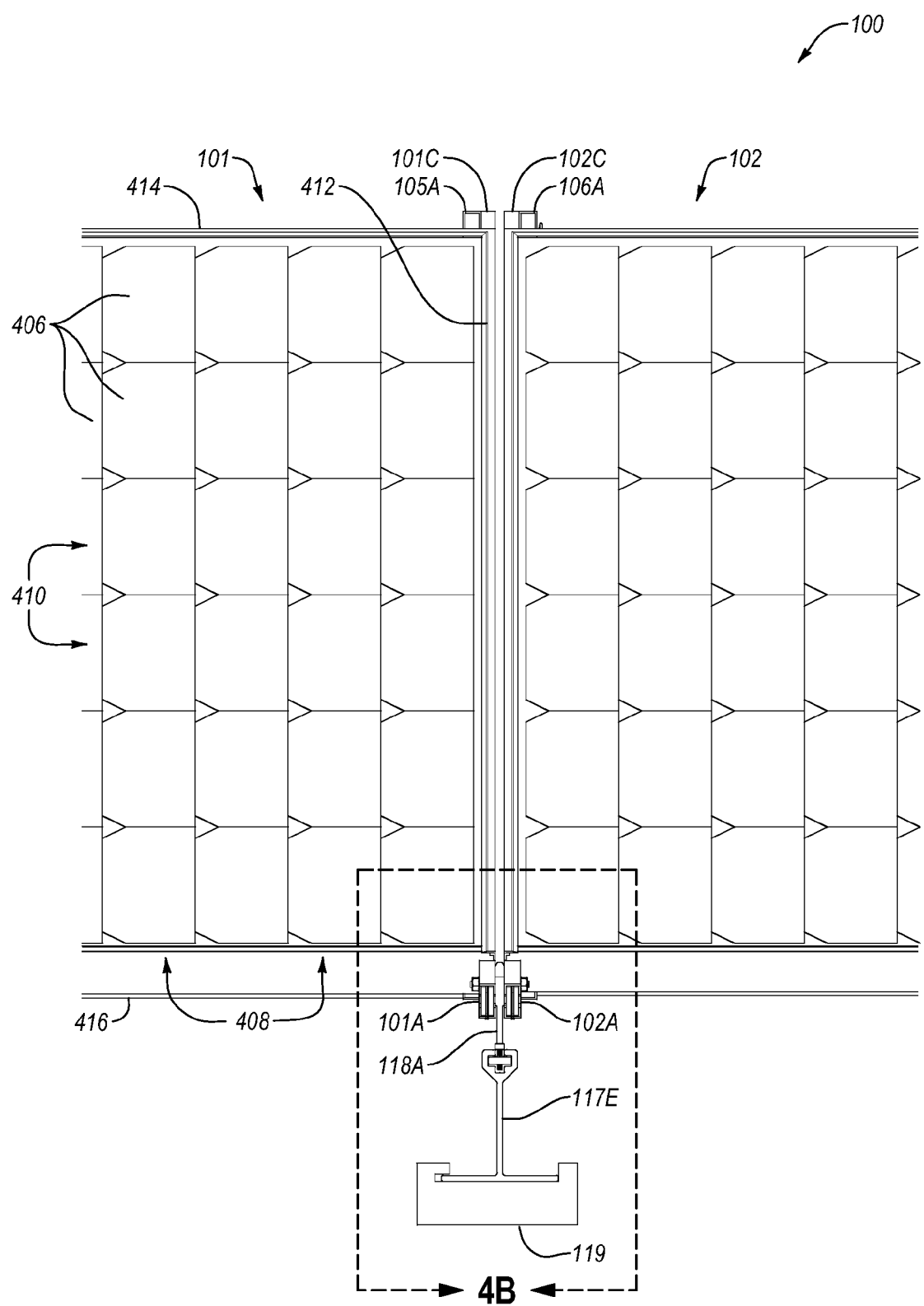
FIG. 4A is a view of a portion of the solar energy system of FIG. 1.
Figure 4B:
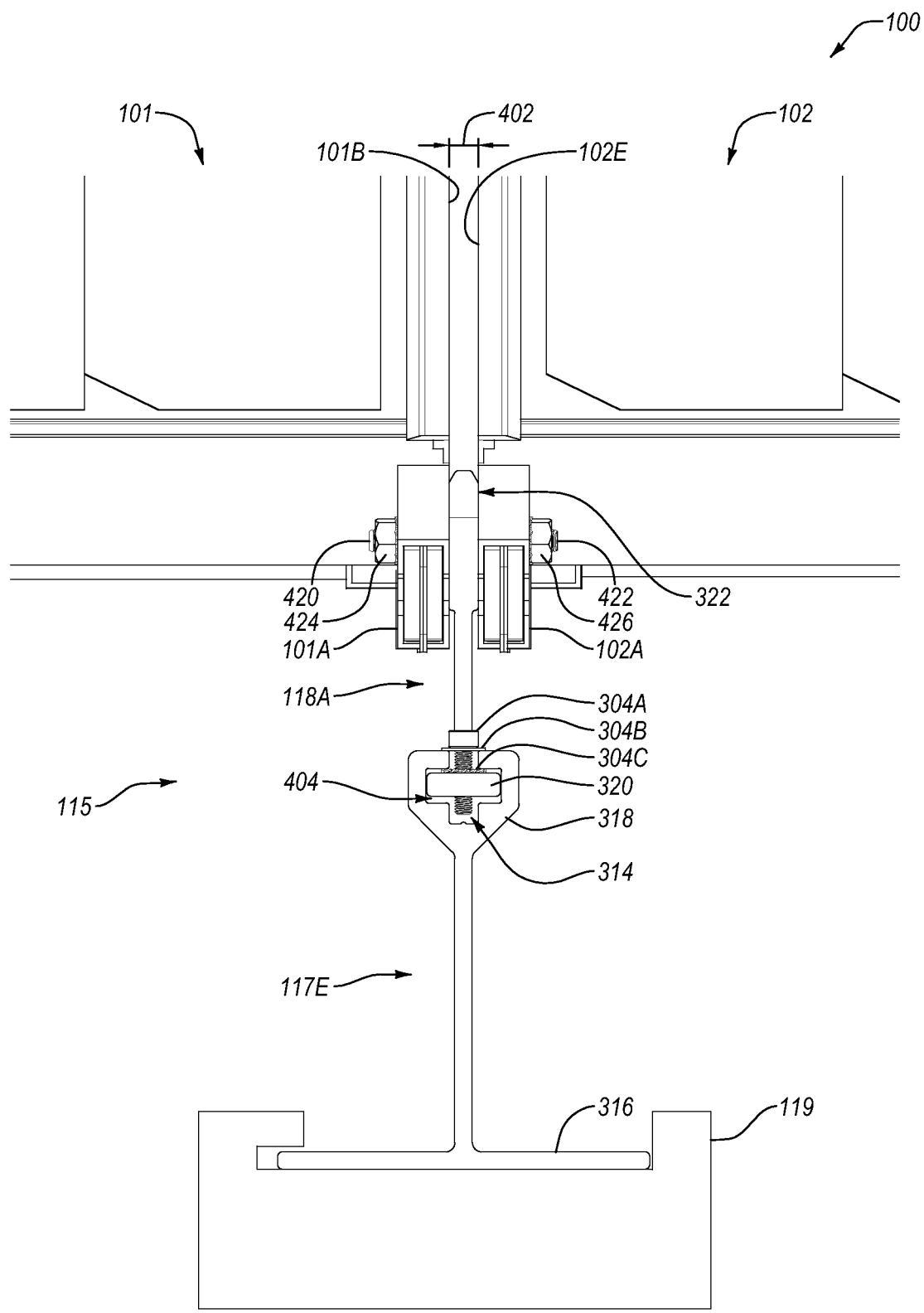
FIG. 4B is a detail view in a detail area 4B illustrated in FIG. 4A.

FIG. 4A is a view of a portion of the solar energy system 100 of FIG. 1 taken orthogonally to the rail 117E from in front of the PV modules 101 and 102. FIG. 4B is a detail view in a detail area 4B illustrated in FIG. 4A. In the illustrated embodiment, the lower adjacent corners 101A, 102A of the PV modules 101, 102 are both connected to the fin 118A. Moreover, the same reference numbers used in the discussion of the rail 117 and the fin 118 with respect to FIGS. 3A-3D are also used in FIGS. 4A-4B to designate like components of the rail 117E and the fin 118A.

According to some embodiments, the PV modules 101-104 of the solar energy system 100, such as the PV modules 101, 102, are connected to the racking assembly 115 such that a module-to-module gap 402 is defined between adjacent PV modules as illustrated in FIG. 4B. Similarly, a reflector-to-reflector gap (not shown) can also be defined between adjacent reflectors.

Although not required in all embodiments, the module-to-module gaps 402 (and the reflector-to-reflector gaps) may be defined by the fins 118 coupled between the adjacent PV modules 101-104 and the adjacent reflectors 105-108. For instance, as illustrated in FIG. 4B, the fin 118A coupled between the PV modules 101 and 102 defines the module-to-module gap 402. More particularly, the top portion 322 of the fin 118A defines the module-to-module gap 402. The sides 101B and 102E of the PV modules 101, 102 on opposing sides of the module-to-module gap 402 include contact points associated with the module-to-module gap 402. Similarly, sides of adjacent reflectors on opposing sides of a reflector-to-reflector gap include contact points associated with the reflector-to-reflector gap.

Module-to-module gaps 402 and associated contact points, and reflector-to-reflector gaps and associated contact points, are examples of gaps and associated contact points that may configure the solar energy system 100 of FIG. 1 with a non-linear force versus displacement profile, such as that illustrated in FIG. 2. For instance, the module-to-module gap 402 permits either or both of the PV modules 101, 102 to rotate about the fin 118A towards the other or towards each other until the sides 101B, 102E including contact points come in contact with each other, at which point the stiffness of each PV module 101, 102 prevents (or at least substantially inhibits) further rotation.

FIG. 4B additionally illustrates an example of how the fin 118A can be connected to the rail 117E. The other fins 118 can be connected to the other rails 117 of the solar energy system 100 in a similar manner. As shown, the threaded fastener 304A is threaded into the threaded hole 306 (FIG. 3A) in the base 320 of the fin 118A until a top side of the base 320 rests inside the longitudinal channel 314 against a bottom side of the overhanging portion of the rail 117E. The flat washer 304B is positioned between a head of the threaded fastener 304A and a top side of the overhanging portion of the rail 117E and is configured to prevent the head of the threaded fastener 304A from binding in the open region of the longitudinal channel 314. The star washer is positioned inside the longitudinal channel 314 between the top side of the fin 118A base 320 and the bottom side of the overhanging portion of the rail 117E and may be configured to ensure a robust electrical connection between the fin 118A and the rail 117E.

FIG. 4B also illustrates an example of how the PV modules 101, 102 can be connected to the fin 118A, with the understanding that the other PV modules 103-104 of the solar energy system 100 can similarly be connected to other fins 118 in the solar energy system 100. In particular, a threaded stud including threaded portions 420, 422 can be pressed, threaded, or otherwise provided in a corresponding hole 310, 312 (FIGS. 3A-3B) of the fin 118A, such that the threaded portion 420 extends from one side and the threaded portion 422 extends from the opposite side of the fin 118A. The lower corner 101A of the PV module 101 can be aligned to receive the threaded portion 420 through a hole defined in the lower corner 101A, after which a star washer is placed on the exposed threaded portion 420 against the lower corner 101A followed by threading a nut 424 onto the exposed threaded portion 420 and tightening it against lower corner 101A. In a similar manner, the lower corner 102A of the PV module 102 can be coupled to the fin 118A using the threaded portion 422, a star washer (not shown) and a nut 426.

FIG. 4B further illustrates a longitudinal gap 404 between the fin 118A base 320 that is received in the longitudinal channel 314 of the rail 117E. In particular, the longitudinal channel 314 defined in the top 318 of rail 117E may be slightly oversized with respect to the fin 118A base 320 received therein such that the longitudinal gap 404 can exist along the length of the fin 118A between the bottom of the base 320 and the bottom of the channel 314, as illustrated in FIG. 4B. Alternately or additionally the longitudinal gap 404 can exist between the top of the base 320 and the top of the channel 314. Either way, a bottom (or top) surface of the base 320 and a bottom (or top) surface of the channel 314 can include the contact points associated with the longitudinal gap 404.

Longitudinal gaps 404 and associated contact points are examples of gaps and associated contact points that may configure the solar energy system 100 of FIG. 1 with a non-linear force versus displacement profile, such as that illustrated in FIG. 2. For instance, some rotation can occur between the rail 117E and fin 118A until the longitudinal gap 404 is closed and the associated contact points come in contact with each other, at which point the stiffness of the fin 118A and the rail 117E prevents (or at least substantially inhibits) further rotation.

Accordingly, one or more of the rail-to-rail gaps, such as the rail-to-rail gaps 120A, 120B (FIG. 1), module-to-module gaps, such as the module-to-module gap 402 (FIG. 4B), reflector-to-reflector gaps, or longitudinal gaps, such as the longitudinal gap 404 (FIG. 4B), within the solar energy system 100 of FIG. 1 may allow the components of the solar energy system to accommodate in-plane and out-of-plane displacement relative to one another until the contact points associated with the corresponding rail-to-rail gap, module-to-module gap, reflector-to-reflector gap or longitudinal gap come in contact with each other. Further, because of the stiffness of the individual components within the solar energy system 100, an overall stiffness of the solar energy system 100 may be much greater when the contact points are in contact with each other than when the contact points are not in contact with each other, which may result in a non-linear force versus displacement profile such as that shown in FIG. 2.

In some embodiments, by interconnecting the PV modules 101-104 and the reflectors 105-108 together using the racking assembly 115, the solar energy system 100 can be installed on a flat or nearly flat installation surface 116, such as a roof, without having to be anchored directly to the installation surface 116. Specifically, the aggregate weight of the solar energy system 100 may be sufficient to self-ballast the solar energy system 100 in some embodiments. Alternately or additionally, the solar energy system 100 may have a generally rectangular footprint where the interconnectedness of the solar energy system 100 allows the solar energy system 100 to be ballasted at only its four corners, or to be anchored at only its four corners to, e.g., anchors drilled into the roof or other installation surface 116.

Moreover, as already explained above, the gaps and associated contact points of the solar energy system 100 may allow the solar energy system 100 to comply to installation surfaces 116 that have some surface unevenness while still having high system stiffness across the solar energy system during shear and lift events caused by, e.g., wind. Additionally, the two-dimensional nature of the solar energy system 100 can provide greater stability against out-of-plane rotation of the PV modules 101-104 as compared to one-dimensional systems in which the PV modules within a row are interconnected but the rows themselves are not interconnected.

As previously mentioned, the upper corners of each of the PV modules 101-104 are connected to corresponding upper corners of the reflector 105-108 immediately behind the PV module 101-104. For instance, while the reflectors 105, 106 are not generally visible in the view of FIG. 4A, a top corner 105A, 106A of each is visible in FIG. 4A. FIG. 4A further illustrates a top corner 101C of the PV module 101. Thus, FIG. 4A illustrates the top corner 101C of the PV module 101 is connected to the top corner 105A of the reflector 105 (not shown in FIG. 4A), while the top corner 102C of the PV module 102 is connected to the top corner 106A of the reflector 106.

Various connection configurations between connected top corners may be implemented in the solar energy system 100. In one embodiment, for instance, each top corner of each PV module 101-104 and of each reflector 105-108 may have a hole or slot defined therein. By aligning the hole or slot in the top corner of a PV module, such as in the top corner 101C of the PV module 101, with the hole or slot in the top corner of a reflector, such as in the top corner 105A of the reflector 105, a pin, rod, screw, bolt, or other fastener can be inserted through the aligned holes or slots and used to connect the top corners together. In an example embodiment, a short rod with a head on one end and an axially transverse hole in the other end is inserted through two top corners until the head is against one of the top corners and the axially transverse hole is on the opposite side of the other top corner; then, a cotter pin (or an R-pin, lynch pin, or the like) is inserted through the axially transverse hole such that the head and the cotter pin retain the short rod within the aligned holes or slots of the two top corners.

Accordingly, some of the embodiments described herein permit individual removal or positional adjustment of the PV modules 101-104 and the reflectors 105-108 without disassembling any other part of the solar energy system 100. The remaining PV modules 101-104 and the reflectors 105-108 hold the position such that any reflector 105-108 can be rotated out and leaned against the opposite PV module 101-104 for full access to the PV module 101-104 behind the reflector 105-108. With the system self-supporting, any PV module 101-104 and/or reflector 105-108 can be field removed and replaced very quickly due to the pinned tops and slotted connections (described below) at the bottom. In addition, there is no need to disrupt the ground to any PV module 101-104, as the entire solar energy system 100 is redundantly interconnected.

Figure 5:
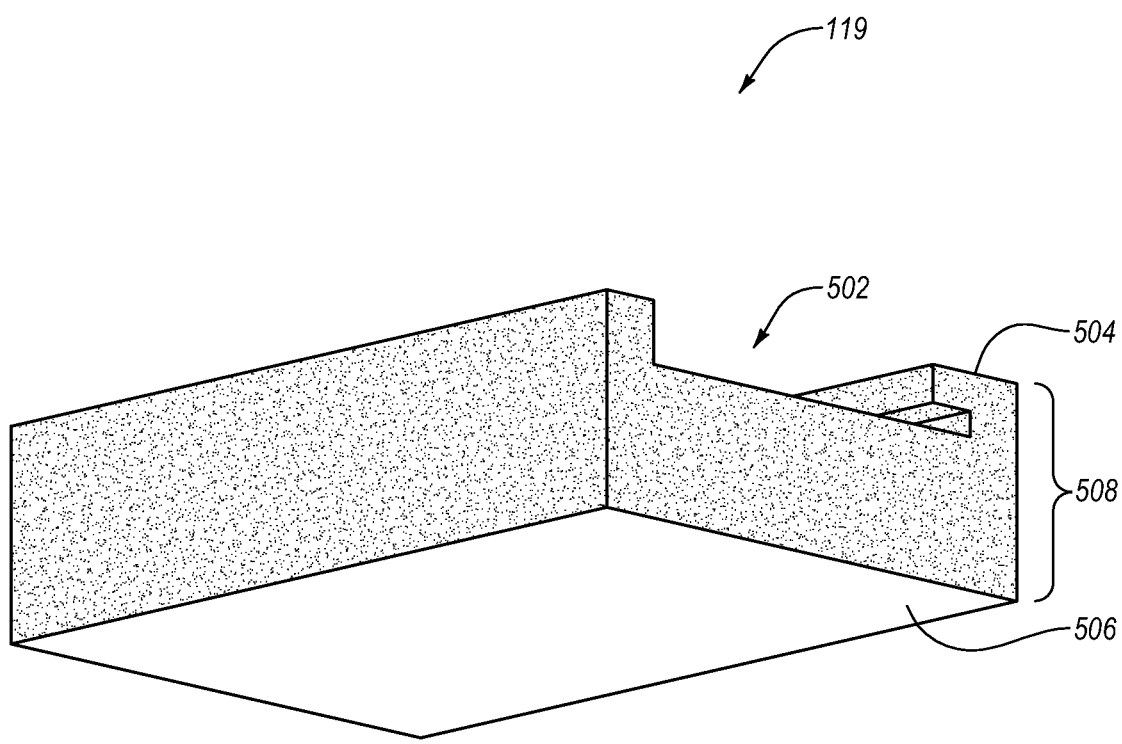
FIG. 5 is a perspective view of a compliant pad included in the racking assembly in the solar energy system of FIG. 1.

FIGS. 4A-4B further illustrate one of the compliant pads 119 positioned beneath the rail 117E. FIG. 5 is a perspective view of the compliant pad 119 of FIGS. 4A-4B. In general, the compliant pads 119 may be sporadically or regularly spaced along the rails 117, between the rails 117 and the installation surface 116 (FIG. 1). Additionally, the compliant pads 119 may be configured to increase the coefficient of friction between the racking assembly 115 and the installation surface 116. For instance, the coefficient of friction between the compliant pads 119 and the installation surface 116 may be higher than the coefficient of friction between the rails 117 and the installation surface 116. The relatively greater coefficient of friction provided by the compliant pads 119 may increase the frictional force between the solar energy system 100 and the installation surface 116 compared to not using the compliant pads 119. The increased frictional force may allow the solar energy system 100 to be self-ballasting based on the weight of the solar energy system 100.

According to some embodiments, and as best seen in FIGS. 4B-5, each of the compliant pads 119 may define a channel 502 (FIG. 5) configured to receive a lengthwise portion of a base 316 (FIG. 4B) of a corresponding one of the rails 117. Alternately or additionally, each of the compliant pads 119 may include a lip 504 that overlaps a portion of the base 316 and is configured to retain the base 316 within the channel 502.

In some embodiments, the entire compliant pad 119 includes the same material throughout, such as, but not limited to, open or closed cell expanded foam polyethylene, ethylene propylene diene Monomer (EPDM) in a solid, open or closed-cell form, or the like or any combination thereof. In these and other embodiments, a thickness of the compliant pad 119 may be in a range from 0.5 inches to 2 inches, or from 0.1 to 1 inch.

Alternately or additionally, each of the compliant pads 119 may include a bottom layer 506 made of a different material than a top layer 508. The bottom layer 506 may be configured to enhance the compliant pad 119-to-installation surface 116 friction and/or may include or act as an adhesive between the rails 117 and the installation surface 116. Alternately or additionally, the bottom layer 506 may include, but is not limited to, butyl rubber, EPDM in a solid, open, or closed cell form, and/or an adhesive material such as gray stuff (also known as DEGASEAL 150 from BASF and/or may include an elastomeric hybrid polyurethane adhesive) or the adhesive marketed as OLYBOND, while the top layer 508 may include, but is not limited to, polyethylene. In these and other embodiments, the top layer 508 may have a thickness in a range from 0.5 to 2 inches, for instance, and the bottom layer 506 may have a thickness in a range from 0.05 to 0.5 inches.

II. PV Modules

Some of the embodiments described herein include PV modules that are insensitive to non-uniform illumination conditions, such as those that might arise when the PV modules are implemented together with reflectors. Thus, the PV modules 101-104 may be illumination agnostic PV modules. Aspects of an illumination agnostic PV module will be discussed with respect to the PV module 101 in the context of FIGS. 4A and 6. Those skilled in the art will appreciate, with the benefit of the present disclosure, that one or more of the other PV modules 102-104 may be similarly configured.

In the illustrated embodiment of FIG. 4A, the PV module 101 includes a plurality of PV cells 406 arranged in a plurality of cell rows 408 and cell columns 410. The PV cells 406 within each cell row 408 are electrically connected in parallel to each other. Additionally, the plurality of cell rows 408 are electrically connected in series to each other. Thus, the current generated within any one of the PV cells 406 can follow any one of multiple paths through the PV module 101 and underperforming PV cells 406 or PV cells 406 exposed to lower illumination intensity will not limit the productivity of other PV cells 406 within the PV module 101.

In some embodiments, current generated by the PV cells 406 during operation travels substantially uni-directionally from left to right or from right to left through the PV cells 406 in the example of FIG. 4A. Further, the parallel electrical connection of the PV cells 406 within each cell row 408 allows current to re-balance from top to bottom to maximize current flow in the case of non-uniform illumination of the PV cells 406. Additional details regarding current balancing are disclosed in U.S. patent application Ser. No. 12/357,268, filed Jan. 21, 2009 for a FLAT-PLATE PHOTOVOLTAIC MODULE (hereinafter the '268 application) and in U.S. patent application Ser. No. 12/357,260, filed Jan. 21, 2009 for REDUNDANT ELECTRICAL ARCHITECTURE FOR PHOTOVOLTAIC MODULES (hereinafter the '260 application). Each of the foregoing patent applications is hereby incorporated herein by reference in its entirety.

As such, the PV module 101 is relatively insensitive to non-uniform illumination conditions as compared to some conventional PV modules that implement only serially-connected PV cells. As used herein, a PV module 101 is relatively insensitive to non-uniform illumination conditions if it has an increasing fill factor when subject to non-uniform illumination. The increasing fill factor at least partially offsets current loss created when a portion of the PV module 101 is shaded (or is underperforming). In contrast, conventional PV modules lose fill factor quickly when even a small area of the conventional PV module is shaded (or is underperforming).

Furthermore, some PV modules 106 that are relatively insensitive to non-uniform illumination conditions are configured to maintain a continuous and non-abrupt change in power as a function of remaining illuminated area. In contrast, some conventional PV modules experience abrupt losses in power as different PV cells are shaded.

FIG. 4A further illustrates that the PV module 101 has a frame, including two side members 412 (only one is visible in FIG. 4A), a top member 414 and a bottom member 416. In some embodiments, the frame of the PV module 101, is extruded and has either a single or a double wall box configuration. Additional details regarding some aspects of some frames that can be implemented in the PV module 101 and/or in the reflectors 105-108 are provided below.

Figure 6:
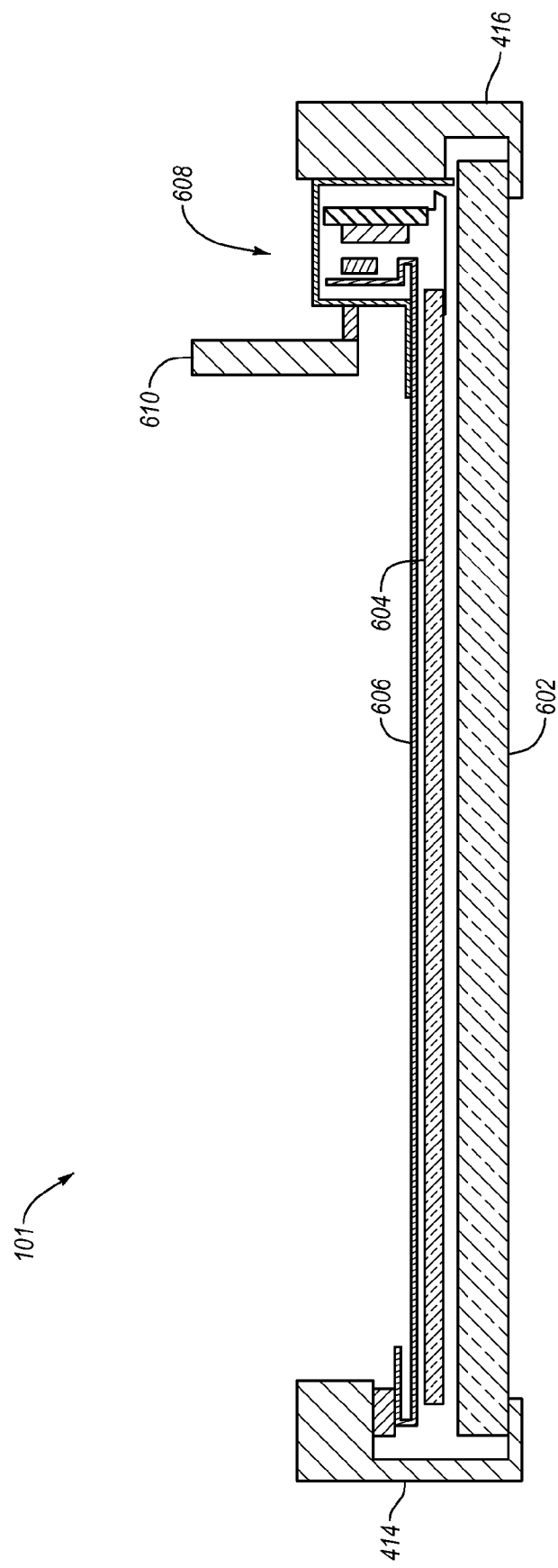
FIG. 6 is a cross-sectional side view of an example PV module that may be included in the solar energy system of FIG. 1.

With additional reference to FIG. 6, the PV module 101 includes a substantially transparent front plate 602 disposed in front of a cell layer 604 that includes all of the PV cells 406. A conductive backsheet 606 is disposed behind the cell layer 604 and is configured to form a current return path for the cell layer 604. The cell layer 604 is sealed between the front plate 602, the conductive backsheet 606 and the frame, including top member 414 and bottom member 416, all of which cooperate to provide environmental protection for the cell layer 604.

The PV module 101 further includes a power conversion device 608 redundantly connected in series with the cell rows 408 (FIG. 4A) of cell layer 604. Two electrical connectors 610 extend from the power conversion device 608, one of which is a supply line and the other of which is a negative line in some embodiments. Note that only one electrical connector 610 is visible in FIG. 6; the other electrical connector 610 is spaced apart from the electrical connector 610 visible in FIG. 6 and positioned either behind or in front of the electrical connector 610 visible in FIG. 6.

The power conversion device 608 includes a plurality of power conversion circuits (not shown) configured to provide power conditioning of the electrical power generated by the PV cells 406 within cell layer 604. "Power conditioning" includes, for example, stepping up the voltage to a predetermined output voltage; maintaining maximum peak power within the PV cells 406 of the cell layer 604; reducing current ripple at the input and output of the power conversion device 608; detecting, monitoring, and maintaining a programmed charge profile for one or more batteries directly connected to the output of power conversion device 608; and/or maintaining a constant voltage source for a battery-less grid tie inverter. By implementing a power conversion device 608 in each of the PV modules 101-104 in a solar energy system 100 (FIG. 1), each of the PV modules 101-104 independently controls its own power conditioning to maximize efficiency of the solar energy system 100.

Additional aspects of some example power conversion devices that can be implemented in the PV module 101 are disclosed in the '268 and '260 applications incorporated herein by reference.

III. Frames

As previously indicated, each of the PV modules 101-104 and the reflectors 105-108 may include a frame. Throughout the present application, frames included in the PV modules 101-104 may be referred to as "module frames," while frames included in the reflectors 105-108 may be referred to as "reflector frames."

Figure 7A:
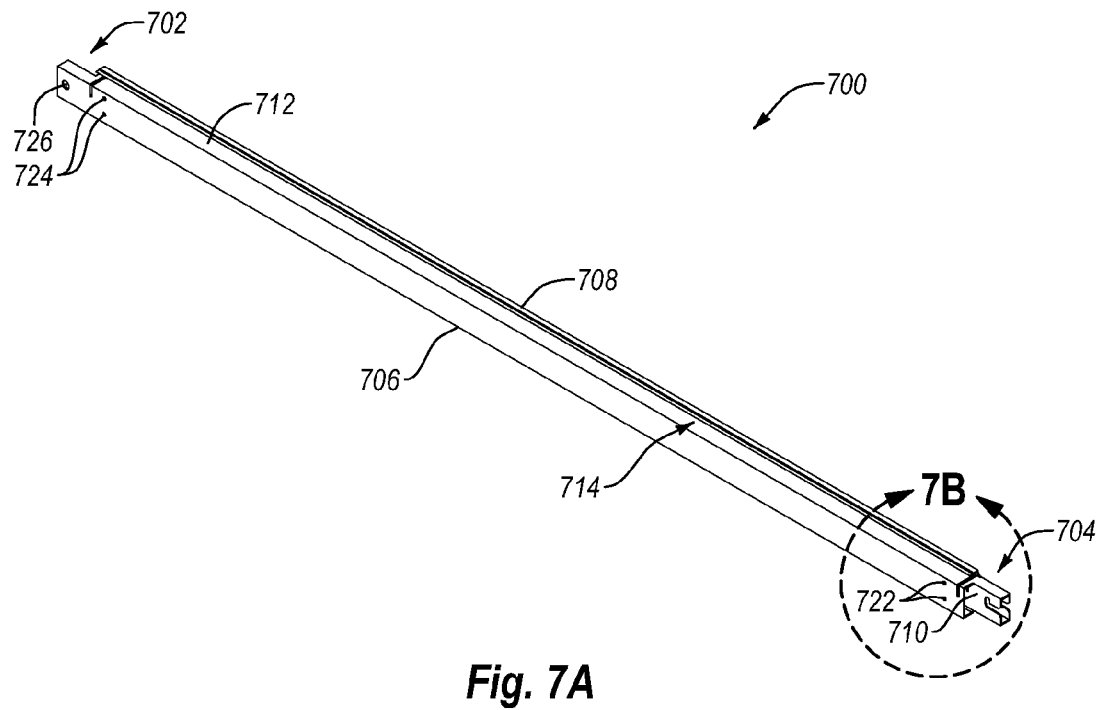
FIG. 7A is a perspective view of an example side member that may be implemented in a reflector frame of a reflector included in the solar energy system of FIG. 1.

As discussed with respect to FIG. 4A, the module frame of the PV modules 101-104 may include two side members and a top and bottom member. The reflector frame of the reflectors 105-108 may similarly include at least two side members. FIG. 7A is a perspective view of an example side member 700 that may be implemented in a reflector frame of one of the reflectors 105-108, for instance. Alternately or additionally, the side member 700 or a modified version thereof may be implemented in the module frame of one of the PV modules 101-104. The side member 700 may be positioned together with an analogously configured side member on opposing sides of the reflector or the PV module in which it is implemented.

Moreover, in some embodiments the side member 700 and/or other portions of the frame of the PV module or the reflector electrically ground the PV module or the reflector directly to the racking assembly 115. Accordingly, the side member and/or other portions of the frame of the PV module or the reflector may include metal and/or other electrically conductive material(s).

In the illustrated embodiment, the side member 700 includes a top end 702 and bottom end 704. The bottom end 704 and the top end 702 of the side member 700 may correspond to, respectively, the bottom and top corners of the corresponding reflector in which the side member 700 is implemented. Accordingly, when implemented in a reflector, the side member 700 may have a length greater than a length of a reflective sheet or material included in the reflector. Thus, the bottom and top ends 704, 702 may be configured to extend beyond corresponding lower and upper edges of the reflective sheet of the reflector, for instance.

The side member 700 in some embodiments has an extruded double-wall-box construction including an inner box 706 connected lengthwise side-by-side with an outer box 708 along at least most of the length of the side member 700. One side of each the inner and outer boxes 706, 708 is a common wall 710 shared between the inner and outer boxes 706, 708 that separates the inner box 706 from the outer box 708. Alternately or additionally, a side member implemented in a PV module frame may have an extruded single-wall-box construction.

The side member 700 further includes a substantially flat surface 712 extending the length of the side member 700. In some embodiments, the flat surface 712 is adhesively coupled to a back side of a reflector's reflective sheet along a corresponding side of the reflective sheet. For instance, a liquid adhesive or acrylic tape or the like may be applied between the flat surface 712 and the back side of the reflective sheet to couple the side member 700 and the reflective sheet together.

Although not required, alternately or additionally, the side member 700 defines a slot 714 extending along at least most of the length of the side member 700. The slot 714 may be configured to receive therein a lengthwise edge portion of the reflective sheet to couple the side member 700 and reflective sheet together.

Figure 7B:
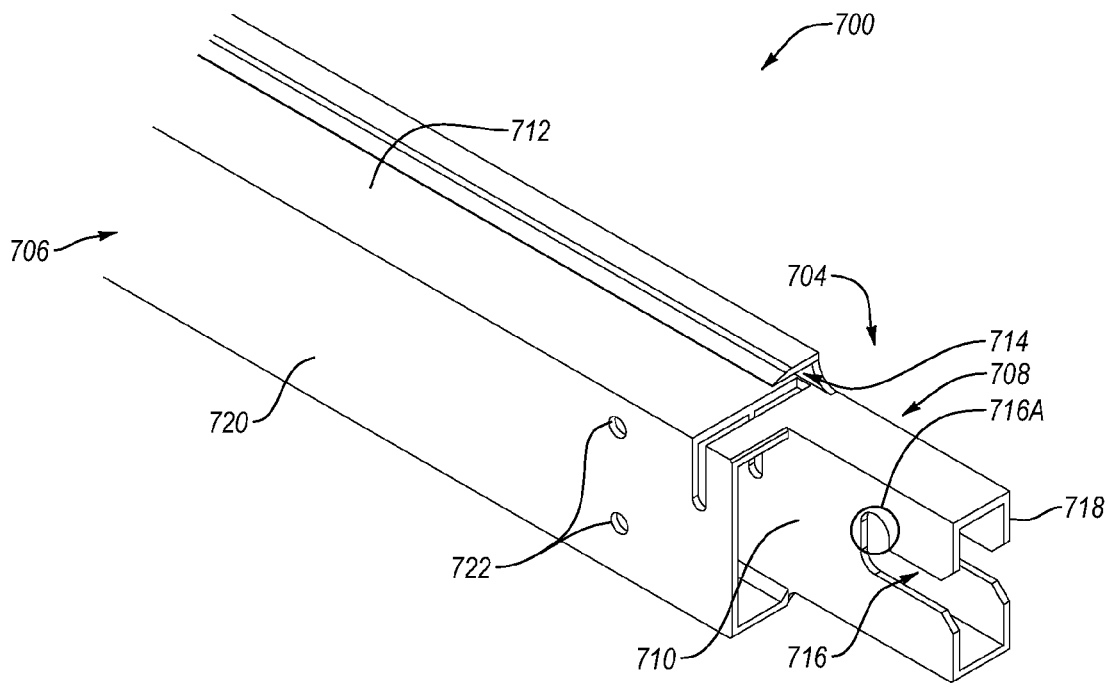
FIG. 7B is a detail view in a detail area 7B illustrated in FIG. 7A.

With continued reference to FIG. 7A, it can be seen that the inner box 706 is absent from the bottom end 704 of the side member 700. In these and other embodiments, the inner box 706 can be removed from the bottom end 704 by machining it away during manufacturing. Optionally, when implemented in a reflector frame as shown in FIG. 7B, the inner box 706 is absent from the bottom end 704 of the side member 700, whereas the outer box 708 may be absent from the top end 702 of the side member 700. When the PV module frame includes a side member with a single-wall-box construction having a single box along its length that is about the same width as the outer box 708 of the side member 700 of FIG. 7A, when a PV module is connected to a reflector immediately behind it, the inner box 706 in the top end 702 of the side member 700 used in the reflector frame is offset from and can be positioned immediately adjacent to the top end of the single-wall-box side member used in the module frame and a pin or other connector can be inserted through holes in the top end of each side member, such as holes 726 in the top end 702 in FIG. 7A, when the holes of one are aligned with the holes of the other.

The pin or other connector employed may configure the top end 702 of the side member 700 in the reflector frame to be removably coupled to the top end of the side member in the module frame. For instance, the pin or other connector can include a pin, cotter pin, R pin, lynch pin, bolt, nut, cam locking device such as those often used to secure a bicycle wheel to its frame, or the like or any combination thereof.

FIG. 7B is a detail view in a detail area 7B illustrated in FIG. 7A. As seen in FIG. 7B, the bottom end 704 defines a slot 716 that may be employed to connect a reflector to a fin 118 of a racking assembly 115 (FIG. 1). The slot 716 may be machined in the bottom end 704 through both the common wall 710 and an outer wall 718 of the outer box 708. Although the slot 716 is depicted in FIG. 7B as having an L-shape, in other embodiments the slot 716 is curved (e.g., J-shaped), straight or has some other shape. Moreover, the slot 716 can be machined from the end of the bottom end 704 as illustrated in FIG. 7B, or from a top or bottom of the bottom end 704. While side members used in PV module frames may have a single-wall-box construction, as opposed to the double-wall-box construction depicted in FIGS. 7A-7B, a slot, such as the slot 716, can analogously be provided in the bottom (and/or top) end of the side members used the PV module frames.

To ensure that loading passes directly from the side member 700 of a reflector to the fin 118 to which the side member 700 is connected, some embodiments are configured to confine the pin or other connector inserted through the slot 716 to an area of the slot 716 denoted at 716A. Accordingly, some embodiments disclosed herein include an insert configured to be received within the outer box 708 at the bottom end 704 of the side member 700 that confines the pin or other connector in the area 716A of the slot 716 and may be further configured to prevent the outer box 708 at the bottom end 704 from being crushed. Such an insert may alternately or additionally be provided in the single box at the bottom end of a single-wall-box side member used in a PV module, for instance. An example insert suitable for the foregoing is described in greater detail below.

Optionally, an inner wall 720 of the side member 700 defines two through holes 722 in or near the bottom end 704. Two through holes may further be defined in each of the common wall 710 and outer wall 718 that are axially aligned with the two through holes 722. In these and other embodiments, a diameter of each of the through holes defined in the common wall 710 and outer wall 718 may be larger than a diameter of a head of a pan head screw or other fastener used to couple the side member 700 to a top member, while a diameter of each of the through holes defined in the inner wall 720 may be smaller than the diameter of the head of the pan screw and larger than a diameter of a threaded shaft of the pan screw. Thus, each of two pan screws can be inserted completely through a corresponding pair of axially aligned through holes in the outer wall 718 and common wall 710 and partially through the corresponding through hole 722 in the inner wall 720 until the head of the pan screw is positioned against an interior surface of the inner wall 720, the threaded shaft of the pan screw securing the top member against an exterior surface of the inner wall 720.

The top end 702 of the side member 700 can be configured similarly to the bottom end 704 and may include, for instance, a portion of the inner box 706 removed, a slot, such as the slot 716 defined therein from the end, top, or bottom of the top end 702, and a pair of through holes 724 formed in the inner wall 720 of the inner box 706 that are axially aligned with corresponding through holes formed in each of the common wall 710 and outer wall 718 of the outer box 708 for receiving pan head screws or other fasteners for coupling the side member 700 to a corresponding bottom member. Alternately or additionally, and as best seen in FIG. 7A, the outer box 708 may be absent from the top end 702 and/or the top end 702 may define through holes 726 in each of the inner wall 720 and common wall 710 (only the through hole 726 in the inner wall 720 is visible in the view of FIG. 7A) as opposed to defining a slot.

Whether the top end 702 includes a slot, such as the L-shaped slot 716 illustrated in FIG. 7B at the bottom end 704 or some other shape, or through holes 726 as illustrated in FIG. 7A, the top end 702 is configured to receive a pin or other fastener through the slot or through holes 726 that also passes through axially aligned through holes defined in a top corner of a PV module immediately behind the reflector in which the side member 700 is implemented to couple the reflector to the PV module.

The bottom end 704 is configured to receive a fastener, such as the threaded portion 420 of the threaded fastener shown in FIG. 4B, through the slot 716 to couple the bottom end 704 to the racking assembly 115 using a nut and/or star washer, such as the nut 424 of FIG. 4B. The fastener used to couple the bottom end 704 to the fin 118 may instead include a cam locking device to apply a positive force between the bottom end 702 and the fin 118 and ensure an electrical connection therebetween, a rod and pin, or the like or any combination thereof. Alternately or additionally, a star washer may be provided between the bottom end 704 and the fin 118 to ensure an electrical connection between the bottom end 704 and the fin 118.

Figure 8:
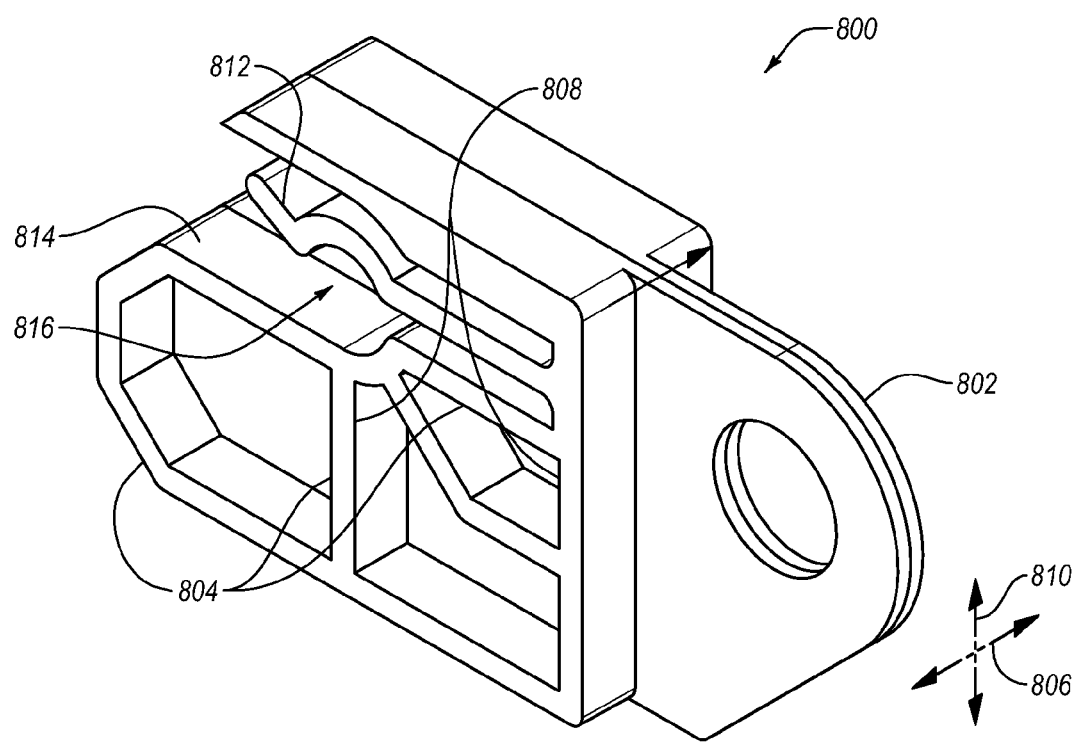
FIG. 8 illustrates an example insert that may be inserted into a bottom end of the side member of FIG. 7A.

FIG. 8 illustrates an example insert 800 such as may be inserted into the outer box 708 at the bottom end 704 of the side member 700. The insert 800 includes extruded plastic in some embodiments, or may include one or more other material(s) formed in any manner. The insert 800 includes a tab 802 configured to aid in the insertion of the insert 800 into and the removal of the insert 800 from the outer box 708 at the bottom end 704.

Although not required, the insert 800 may include one or more width-wise support portions 804 that are configured to prevent compressive forces in a direction 806 from crushing the insert 800, and by extension the outer box 708 at the bottom end 704 of the side member 700. The insert 800 may additionally include one or more height-wise support portions 808 that are configured to prevent compressive forces in a direction 810 from crushing the insert 800 and outer box 708 at the bottom end 704 of the side member 700. In the illustrated embodiment, the height-wise support portions 808 are also width-wise support portions.

The insert 800 further includes a beam 812 extending from one of the height-wise support portions 808, and a lower portion 814. The beam 812 includes an indent 816. The beam 812 including the indent 816, and the lower portion 814 are configured to cooperate together to constrain a fastener in the direction 810.

Figure 9:
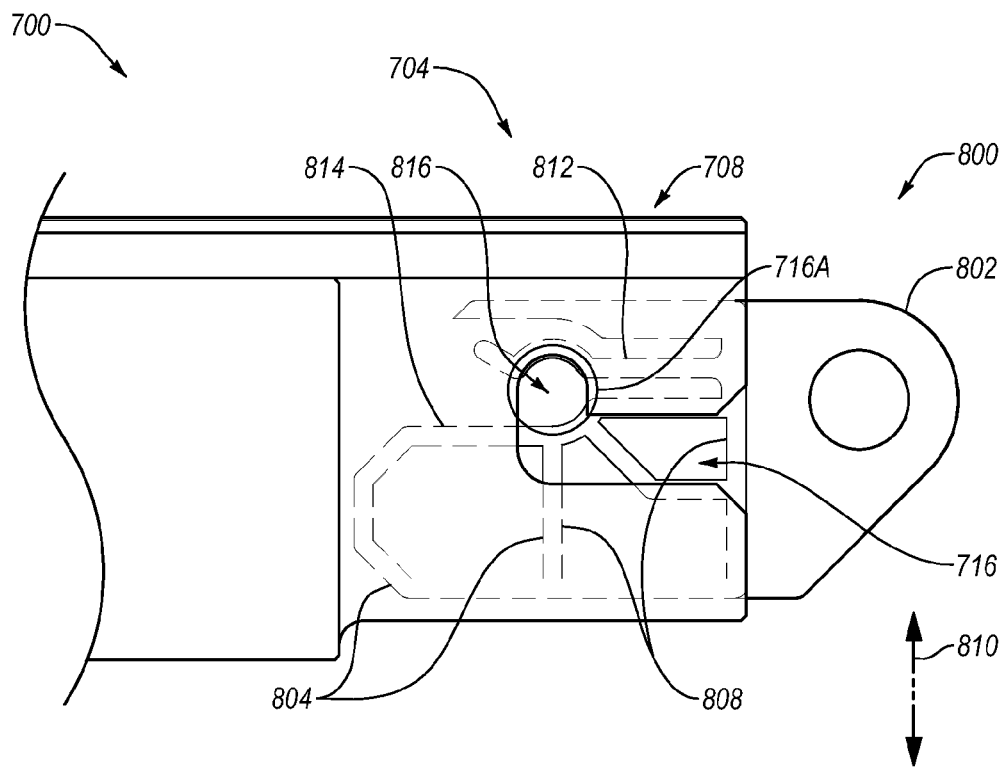
FIG. 9 illustrates the insert of FIG. 8 received into the side member of FIG. 7A at the bottom end of the side member of FIG. 7A.

FIG. 9 illustrates the insert 800 received within the outer box 708 at the bottom end 704 of the side member 700. The dotted lines represent the portion of the insert 800 that are not visible in the view of FIG. 9 where the insert is covered by the side member 700. It can be seen from FIG. 9 that the beam 812 and the lower portion 814 of the insert 800 are configured to confine a fastener in the area 716A of the slot 716 when the indent 816 of the beam 812 is aligned with the area 716A of the slot 716. It is also apparent from FIG. 9 that when the insert 800 is received within the outer box 708 at the bottom end 704 of the side member 700, the width-wise support members 804 and the height-wise support members 808 are configured to prevent the bottom end 704 of the side member 700 from being crushed by compressive forces in the directions 806 (FIGS. 8) and 810.

IV. Adjustable Reflectors

As already mentioned above, the configuration of the solar energy system 100 permits individual removal or positional adjustment of the PV modules 101-104 and/or reflectors 105-108 without requiring support of multiple modules or reflectors in the system, and without disrupting the electrical grounding of the solar energy system 100. In these and other embodiments, the position of the reflectors 105-108, e.g., the angle of the top surface of the reflectors 105-108 relative to horizontal, may be adjusted two or more times per year to increase annual output of the solar energy system 100.

Figure 10A:
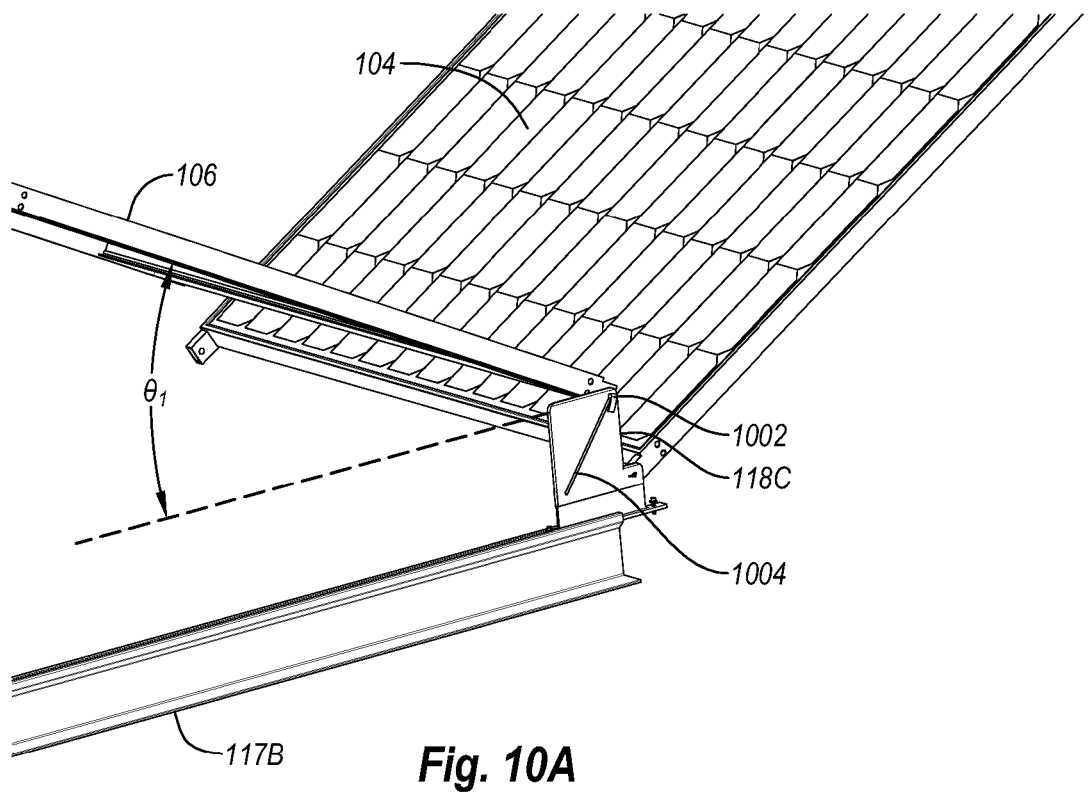
FIGS. 10A and 10B each include a perspective view of a reflector and oppositely facing PV module of FIG. 1, with the reflector in a first position in FIG. 10A and in a different second position in FIG. 10B.
Figure 10B:
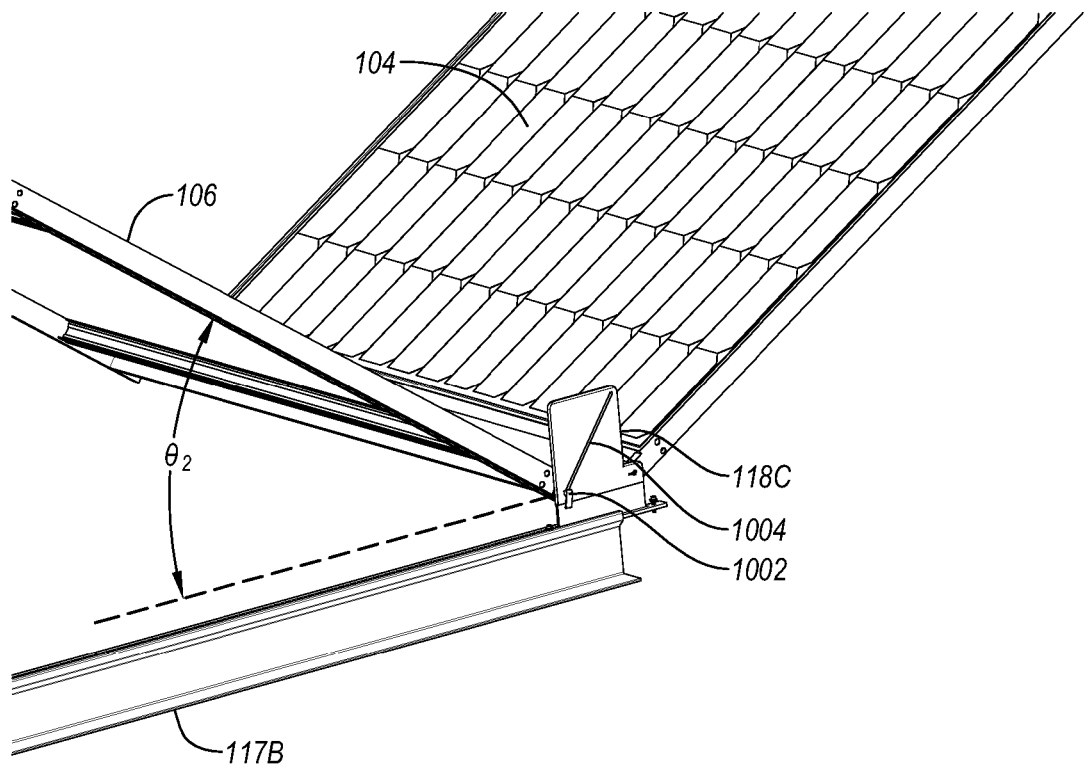

For example, FIGS. 10A and 10B each include a perspective view of the reflector 106 and the PV module 104, with the reflector 106 in a first position in FIG. 10A and in a second position in FIG. 10B. FIGS. 10A-10B also illustrate an embodiment of the fin 118C of FIG. 1. In the first position, the reflector 106 is positioned at a first angle $\theta_1$ relative to horizontal, while in the second position, the reflector 106 is positioned at a second angle $\theta_2$ relative to horizontal. In the illustrated embodiment, the second angle $\theta_2$ is larger than the first angle $\theta_1$. The reflector 106 may be left in the first position in FIG. 10A from fall to spring and in the second position in FIG. 10B from spring to fall in installation sites in the northern hemisphere, for example. Analogous adjustments can be made for reflectors in solar energy systems located in the southern hemisphere.

As shown in FIGS. 10A-10B, a lower corner of each of the reflector 106 and the PV module 104 is connected to the same fin 118C, which fin 118C connects the reflector 106 and the PV module 104 to the rail 117B and the rail 117C (FIG. 1). A pin or other connector 1002 is provided for connecting the lower corner of the reflector 106 to the fin 118C. The pin or other connector 1002 may include a pin, cotter pin, R pin, lynch pin, bolt, nut, cam locking device, or the like.

Although not shown in FIGS. 10A-10B, the top corners of the reflector 106 are connected to the top corners of the PV module 102 (FIG. 1) immediately behind the reflector 106, as described with respect to FIG. 4A above. The connections between the top corners of the reflector 106 and the PV module 102 define a first axis of rotation that is parallel to top edges of the reflector 106 and the PV module 102 and about which the reflector 106 can rotate relative to the PV module 102.

Additionally, the fin 118C in FIGS. 10A-10B defines a slot 1004 in which the pin or other connector 1002 can travel between a first endpoint (e.g., the position of the pin or other connector 1002 shown in FIG. 10A) corresponding to the first position of the reflector 106 shown in FIG. 10A, and a second endpoint (e.g., the position of the pin or other connector 1002 shown in FIG. 10B) corresponding to the second position of the reflector 106 shown in FIG. 10B. When the pin or other connector 1002 is traveling in the slot 1004 between the endpoints, the reflector 106 rotates relative to the PV module 102 about the first axis of rotation defined by the connections between the top corners of the reflector 106 and the PV module 102.

Figure 11A:
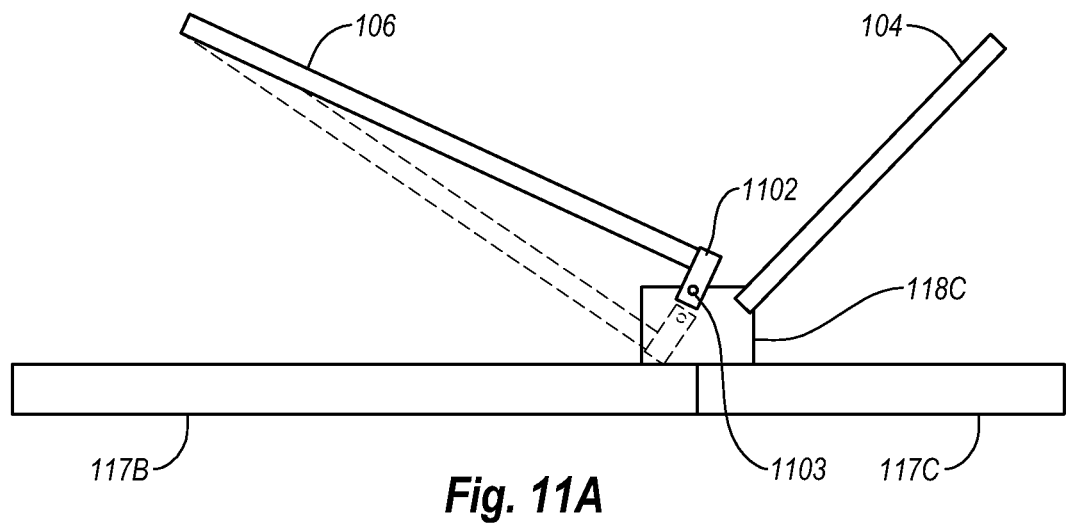
FIG. 11A illustrates an embodiment of the solar energy system of FIG. 1 in which reflectors in the solar energy system can be adjusted between first and second positions.

FIG. 11A illustrates another embodiment of the solar energy system 100 in which the reflector 106 is configured to be adjusted between first and second positions by a reversible L-shaped post 1102 containing a hole 1103 for a pin connection. The pin is not shown in FIG. 11A. This allows the fin height to remain low and avoid shadowing in the AM and PM hours as might otherwise occur with a taller fin, such as the embodiment of the fin 118C illustrated in FIGS. 10A-10B. The reversible L-shaped post 1102 is pushed into a slot in the bottom of the reflector 106 for one operation, and for reversing is pulled back out and re-inserted in an opposite orientation shown by dashed lines in FIG. 11A.

In the embodiment of FIG. 11A, the fin 118C may include two or more holes (or a slot) with which the hole 1103 can be aligned in either orientation of the reversible L-shaped post 1102 for receiving a pin or other fastener therethrough, or the fin 118C may include a single hole with which the hole 1103 can be aligned in either orientation of the reversible L-shaped post 1102. The other reflectors 105 and 107-108 of the solar energy system 100 may be similarly adjusted. The reflector 106 is illustrated in the first position in FIG. 11A, with the dashed outline representing the reflector 106 in the second position.

Figure 11B:
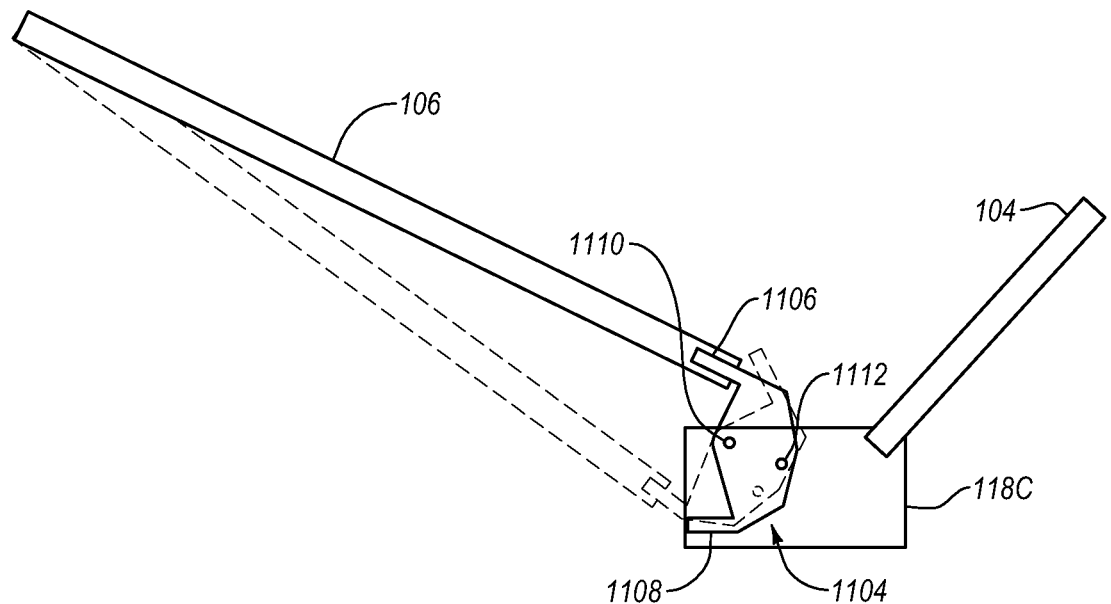
FIG. 11B illustrates another embodiment of the solar energy system of FIG. 1 in which reflectors in the solar energy system can be adjusted between first and second positions.

FIG. 11B illustrates yet another embodiment of the solar energy system 100 in which the reflector 106 is configured to be adjusted between first and second positions using a rotating connector 1104 coupled to the fin 118C. The other reflectors 105 and 107-108 may be similarly adjusted. The reflector 106 is illustrated in the first position in FIG. 11B with the rotating connector 1104 in a first connector position to retain the reflector 106 in the first position, with the dashed outlines representing the reflector 106 in the second position and the rotating connector 1104 in a second connector position to retain the reflector 106 in the second position.

In these and other embodiments, the reflector 106 may define a slot (not shown) in each of two lower corners of the reflector 106, each slot being configured to receive an upper protrusion 1106 of the rotating connector 1104 to retain the reflector 106 in the first position, or to receive a lower protrusion 1108 of the rotating connector 1104 to retain the reflector 106 in the second position.

The rotating connector 1104 is rotatably connected to the fin 118C by a rotational pin 1110 that defines an axis of rotation of the rotating connector 1104 relative to the fin 118C. A removable pin 1112 is configured to be received in a through hole in the rotating connector 1104 and a particular one of two through holes in the fin 118C, each of the two through holes in the fin 118C corresponding to a different one of the first connector position or the second connector position.

Accordingly, FIGS. 10A-11B illustrate various arrangements for allowing individual seasonal adjustments of the reflectors 105-108 of the solar energy system 100. While adjustments of two, three, four or more times per year are possible, adjustments just twice per year where $\theta_2-\theta_1$ (see FIGS. 10A-10B) is between ten and fifteen degrees provide for a 10-18% increase in annual energy production according to some embodiments disclosed herein, compared to embodiments in which the reflectors 105-108 (or PV modules 101-104) are not positionally adjusted at all during the year.

V. Rainwater Collection

Figure 12A:
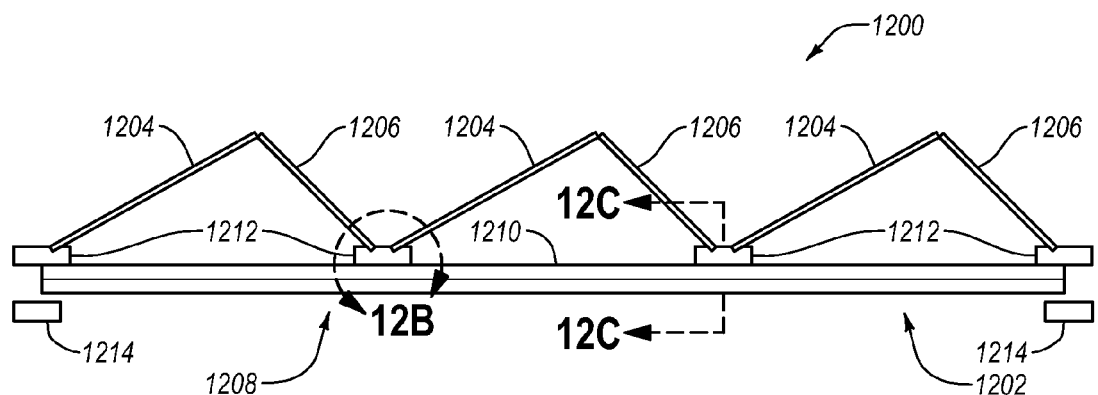
FIG. 12A illustrates a solar energy system including a rainwater collection subsystem.

In some embodiments, the solar energy system 100 further includes a rainwater collection subsystem configured to collect rainwater that lands on the solar energy system 100, or accumulated snow on the solar energy system 100 that subsequently melts. For instance, FIG. 12A illustrates a solar energy system 1200 including a rainwater collection subsystem 1202 according to some embodiments disclosed herein. The solar energy system 1200 is similar in many respects to the solar energy system 100 described above and includes, for instance, multiple reflectors 1204, multiple PV modules 1206, and a racking assembly 1208 including rails 1210 and fins 1212. Although not apparent from FIG. 12A, each of the reflectors 1204 visible in FIG. 12A may be one of multiple reflectors 1204 in a row of reflectors 1204, and each of the PV modules 1206 visible in FIG. 12A may be one of multiple PV modules 1206 in a row of PV modules 1206.

The rainwater collection subsystem 1202 in some embodiments includes at least one or more storage reservoirs 1214 as illustrated in FIG. 12A. The rainwater collection subsystem 1202 may further include extruded drip gutters on the reflectors 1204 and the PV modules 1206, as well as edge extensions on the rails 1210, all of which cooperate together to collect and channel rainwater from the upper surface of the reflectors 1204 and the PV modules 1206 to the storage reservoirs 1214. Additional details regarding example extruded drip gutters and edge extensions are provided with respect to FIGS. 12B and 12C.

Figure 12B:
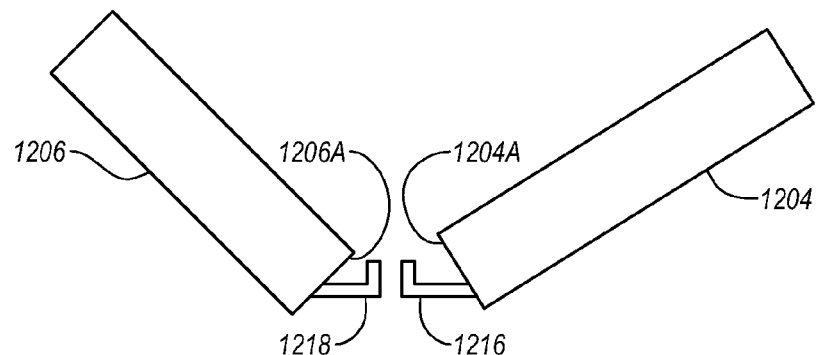
FIG. 12B is a view in an area 12B identified in FIG. 12A with a rail and corresponding pins or connectors removed.

FIG. 12B is a view in an area 12B identified in FIG. 12A with the rail 1212 and corresponding pins or connectors removed. As seen in FIG. 12B, each of the reflector 1204 and the PV module 1206 respectively includes an extruded drip gutter 1216 or 1218 that extends from a bottom edge 1204A, 1206A, respectively, of the reflector 1204 or the PV module 1206. Each of the extruded drip gutters 1216, 1218 is continuous along the bottom edge 1204A, 1206A of the reflector 1204 or the PV module 1206 and is open at one or both ends such that rainwater within the extruded drip gutter 1216 or 1218 can be expelled from the open end(s) of the extruded drip gutter 1216 or 1218.

Figure 12C:
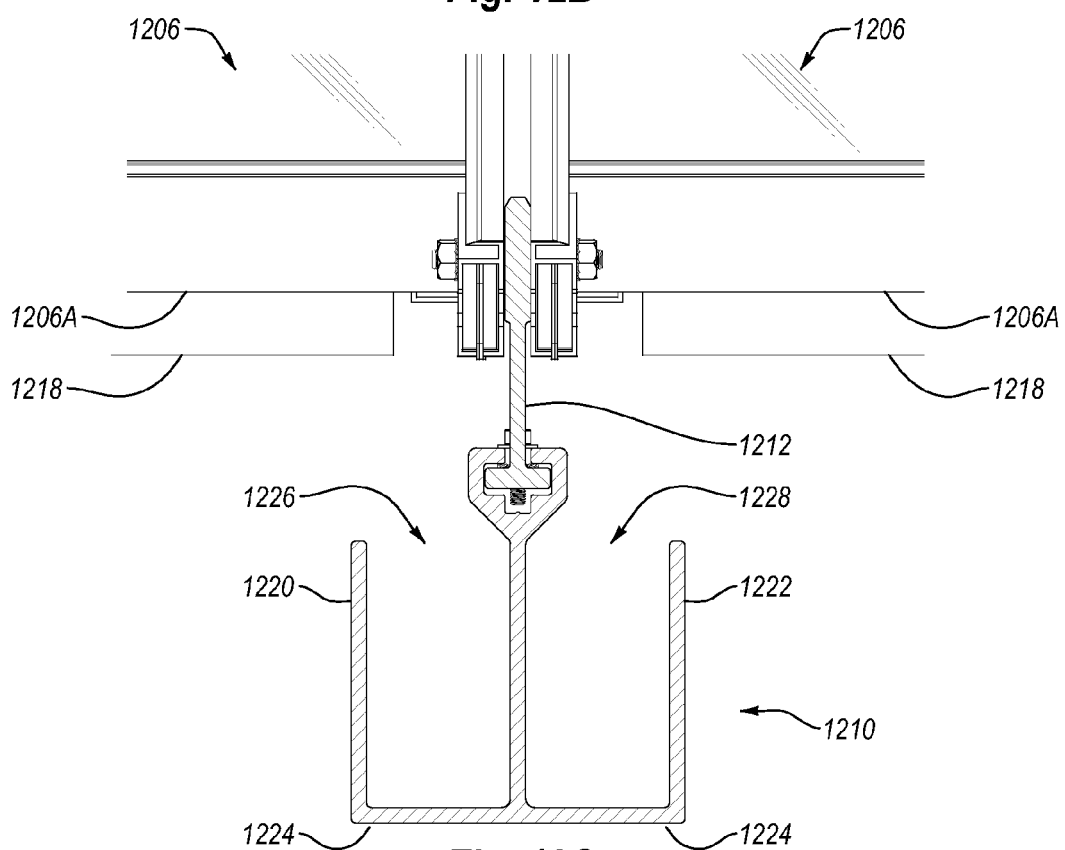
FIG. 12C is a cross-sectional view of a portion of the solar energy system in a cutting plane 12C illustrated in FIG. 12A.

FIG. 12C is a cross-sectional view of a portion of the solar energy system 1200 in a cutting plane 12C illustrated in FIG. 12A. As seen in FIG. 12C, the rail 1210 includes edge extensions 1220, 1222 extending upwards from a base 1224 of the rail 1210. Each of the edge extensions 1220, 1222, together with the base 1224 and other portions of the rail 1212, define rail channels 1226, 1228 on opposing sides of the rail 1212. FIG. 12C further illustrates that the rail channels 1226, 1228 are positioned beneath open ends of the extruded drip gutters 1218 that extend from the bottom edges 1206A of two adjacent PV modules 1206. The rail channels 1226, 1228 are similarly positioned beneath open ends of extruded drip gutters 1216 that extend from the bottom edges 1204A of adjacent reflectors 1204. As seen in FIG. 12A, the rails 1210 also have open ends positioned above the storage reservoirs 1214 or are otherwise configured such that the rail channels 1226, 1228 are in fluid communication with the storage reservoirs 1214.

Accordingly, rainwater (or snowmelt, or the like) present on the surface of the reflectors 1204 or the PV modules 1206 generally runs down the surface of the reflectors 1204 or the PV modules 1206 due to gravity and into the extruded drip gutters 1216, 1218. The extruded drip gutters 1216, 1218 collect the rainwater and channel it towards the corresponding open end(s) of the extruded drip gutters 1216, 1218, whereupon the rainwater is expelled. Because the rail channels 1226, 1228 are positioned beneath the open ends of the extruded drip gutters 1216, 1218, the expelled rainwater is captured in the rail channels 1226, 1228. The rainwater captured in the rail channels 1226, 1228 then flows towards one or both open ends of the rail 1210 and into the storage reservoirs 1214.

VI. Reflectors

Figure 13A:
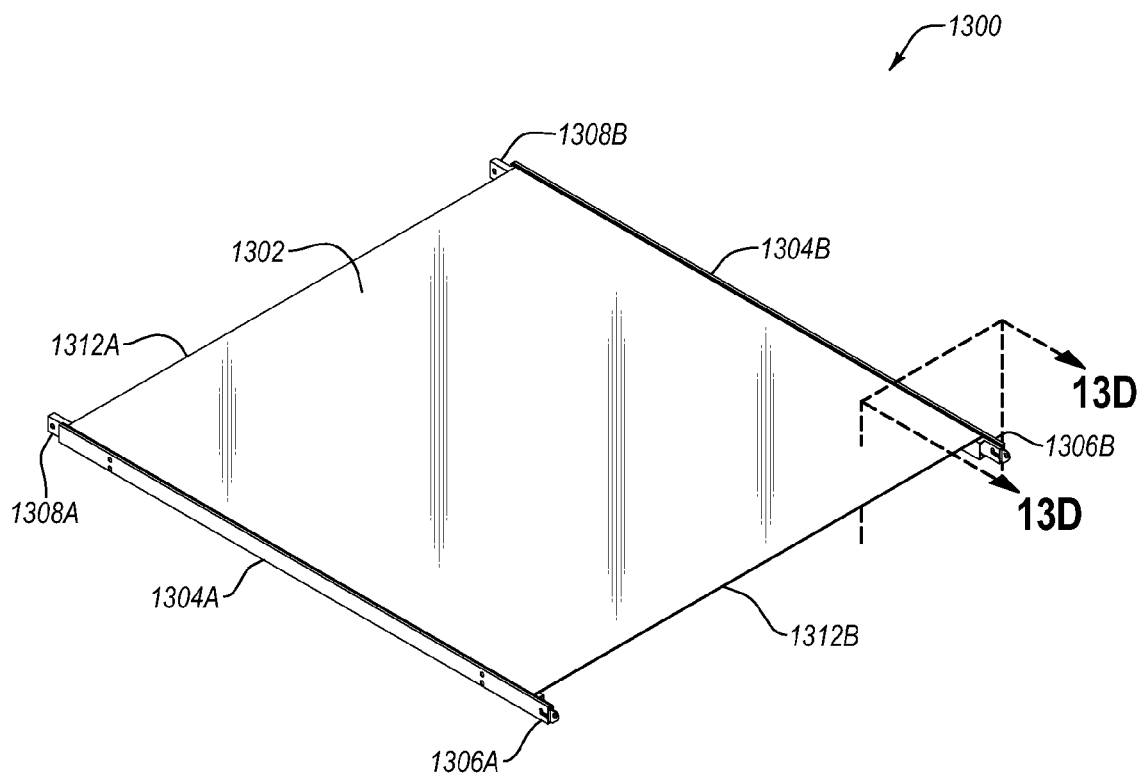
FIG. 13A is a perspective view of an example reflector that can be implemented in the solar energy systems of FIGS. 1 and 12A.

FIG. 13A is a perspective view of an example reflector 1300, arranged in accordance with at least some embodiments described herein. The reflector 1300 may be implemented in, for instance, the solar energy systems 100, 1200 described herein as the reflectors 105-108 or 1204. In the illustrated embodiment of FIG. 13A, the reflector 1300 includes a reflective sheet 1302 and a frame including two side members 1304A and 1304B.

In general, the reflective sheet 1302 is configured to substantially reflect light having wavelengths within a reflectance spectrum of the reflective sheet 1302. For instance, the reflective sheet 1302 may have a reflectance of 80% or more, or 90% or more, or 95% or more with respect to wavelengths within the reflectance spectrum of the reflective sheet 1302. Additional details regarding aspects of the reflective sheet according to some embodiments are described below.

The reflector 1300 includes two bottom corners 1306A, 1306B and two top corners 1308A, 1308B. Each of the two top corners 1308A, 1308B may be configured to be coupled to a corresponding top corner of a PV module immediately behind the reflector 1300. Each of the two bottom corners 1306A, 1306B may be configured to be coupled to a corresponding rail of a racking assembly in a solar energy system.

The frame including the two side members 1304A and 1304B supports the reflective sheet 1302. Each of the side members 1304A and 1304B may be implemented as described above with respect to the side member 700 of FIGS. 7A-9. For instance, each of side members 1304A, 1304B may have an extruded double-wall-box construction with a slot 714 for receiving a lengthwise edge portion of the reflective sheet 1302, or a flat surface 712 to which a back side of the reflective sheet 1302 along a side of the reflective sheet 1302 is adhesively coupled. Alternately or additionally, each of the side members 1304A, 1304B may be configured to receive in a top and/or bottom end thereof an insert, such as the insert 800 of FIGS. 8-9, as described above.

Figure 13B:
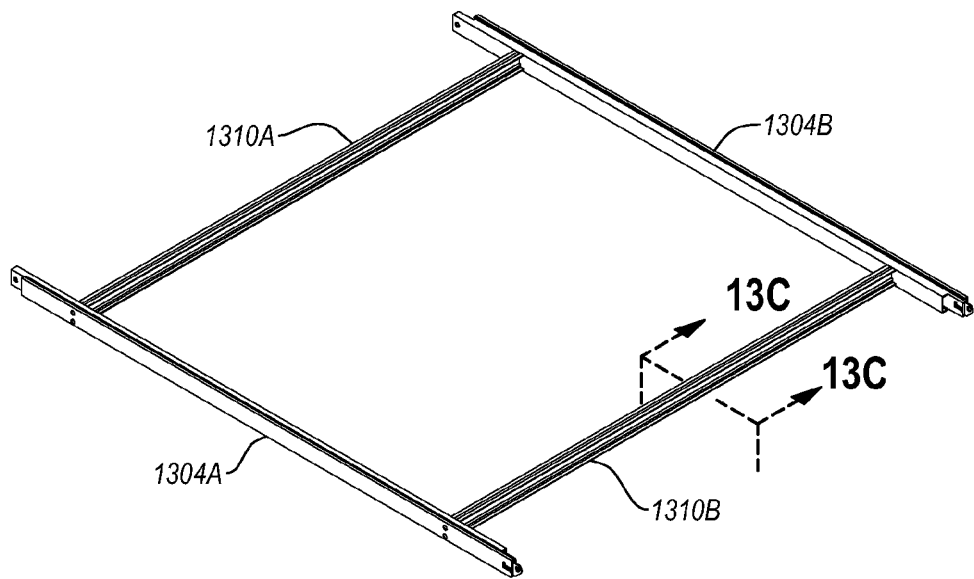
FIG. 13B is a perspective view of a frame included in the reflector of FIG. 13A.

FIG. 13B is a perspective view of the frame of the reflector 1300 of FIG. 13A, arranged in accordance with at least some embodiments described herein. In the illustrated embodiment, the frame of the reflector 1300 further includes two support members 1310A, 1310B that extend widthwise between the two side members 1304A, 1304B. The support members 1310A, 1310B are positioned behind the reflective sheet 1302, such that the support members 1310A, 1310B are not visible in FIG. 13A behind the reflective sheet 1302.

Whereas the support members 1310A, 1310B are positioned behind the reflective sheet 1302, rather than at, respectively, top and bottom edges 1312A, 1312B (FIG. 13A) of the reflective sheet 1302, snow is more likely to slide completely off the bottom edge 1312B of the reflective sheet 1302 without accumulating on the reflective sheet 1302 than if a support member was present along the bottom edge 1312B. Analogously, dirt and other soiling are less likely to accumulate along the bottom edge 1312B and/or are more likely to be washed off during rain than if a support member was present along the bottom edge 1312B. By keeping the entire surface of the reflective sheet 1302 more free from snow, dirt or other soiling, the reflective sheet 1302 can consistently reflect more light towards a PV module positioned opposite the reflective sheet 1302 than if snow, dirt or other soiling were to accumulate on a portion or all of the reflective sheet 1302.

Alternately or additionally, the frame of FIGS. 13A-13B in which the support members 1310A, 1310B are positioned behind the reflective sheet 1302 may be less expensive than a frame that is present along all four sides of a reflective sheet. For instance, the frame of FIGS. 13A-13B may be smaller, and thus less expensive, than a frame that is present along all four sides of a reflective sheet. As another example, whereas the support members 1310A, 1310B are positioned behind the reflective sheet 1302, the support members 1310A, 1310B may be at least partially protected from potentially damaging illumination from the sun and/or weather damage, such that the support members 1310A, 1310B do not need a finish applied to protect against the potentially damaging illumination or weather, and may therefore be less expensive.

Figure 13C:
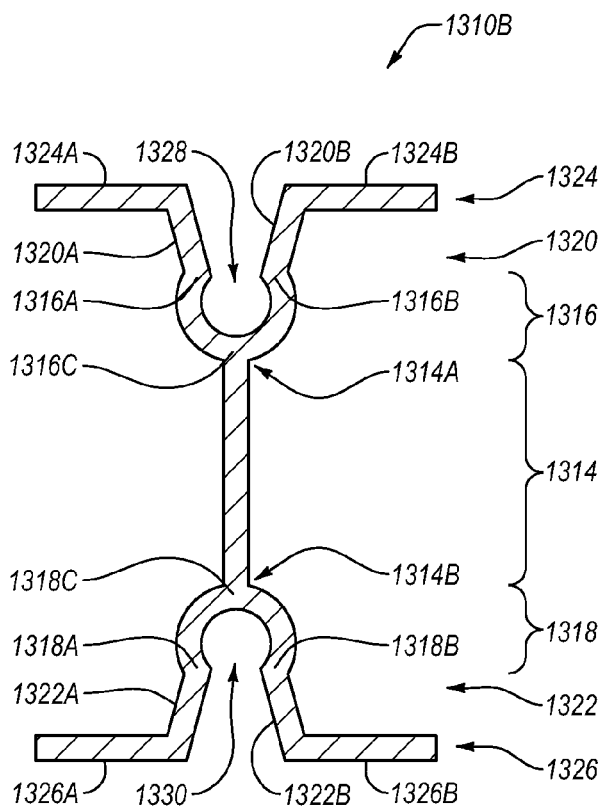
FIG. 13C is a cross-sectional view of a support member included in the frame of FIG. 13B in cutting plane 13C of FIG. 13B.

FIG. 13C is a cross-sectional view of the support member 1310B in cutting plane 13C illustrated in FIG. 13B. The cross-sectional view of the support member 1310B is in a plane normal to a length of the support member 1310B. The support member 1310A may have a similar cross-sectional shape as the support member 1310B illustrated in FIG. 13C.

As seen in FIG. 13C, the cross-sectional shape of the support member 1310B is characterized by or includes a base member 1314, a first arc 1316, a second arc 1318, a first leg pair 1320, a second leg pair 1322, a first foot pair 1324 and a second foot pair 1326.

The base member 1314 includes a first end 1314A and a second end 1314B. The first arc 1316 is connected to the first end 1314A and the second arc 1318 is connected to the second end 1314B.

Each of the first and second arcs 1316, 1318 includes a first endpoint 1316A, 1318A, a second endpoint 1316B, 1318B and a midpoint 1316C, 1318C located along the first or second arc 1316, 1318 halfway between the first endpoint 1316A, 1318A and the second endpoint 1316B, 1318B. Each of the first and second arc 1316, 1318 is connected to the first or second end 1314A, 1314B of the base member 1314 at the corresponding midpoint 1316C or 1318C. Each of the first and second arcs 1316, 1318 defines a semi-circular cavity 1328, 1330, respectively.

The first leg pair 1320 is connected to the first arc 1316, and the second leg pair 1322 is connected to the second arc 1318. Each of the first and second leg pairs 1320, 1322 includes a first leg 1320A, 1322A connected to the first endpoint 1316A, 1318A of the corresponding one of the first or second arcs 1316 or 1318, and a second leg 1320B, 1322B connected to the second endpoint 1316B, 1318B of the corresponding one of the first or second arcs 1316 or 1318.

The first foot pair 1324 is connected to the first leg pair 1320 and the second foot pair 1326 is connected to the second leg pair 1322. Each of the first and second foot pairs 1324, 1326 includes a first foot 1324A, 1326A and a second foot 1324B, 1326B. The first foot 1324A, 1326A is connected to the first leg 1320A, 1322A of the corresponding one of the first or second leg pairs 1320, 1322. The second foot 1324B, 1326B is connected to the second leg 1320B, 1322B of the corresponding one of the first or second leg pairs 1320, 1322. The first foot 1324A and second foot 1324B of the first foot pair 1324 are collinear. Similarly, the first foot 1326A and second foot 1326B of the second foot pair 1326 are collinear.

Figure 13D:
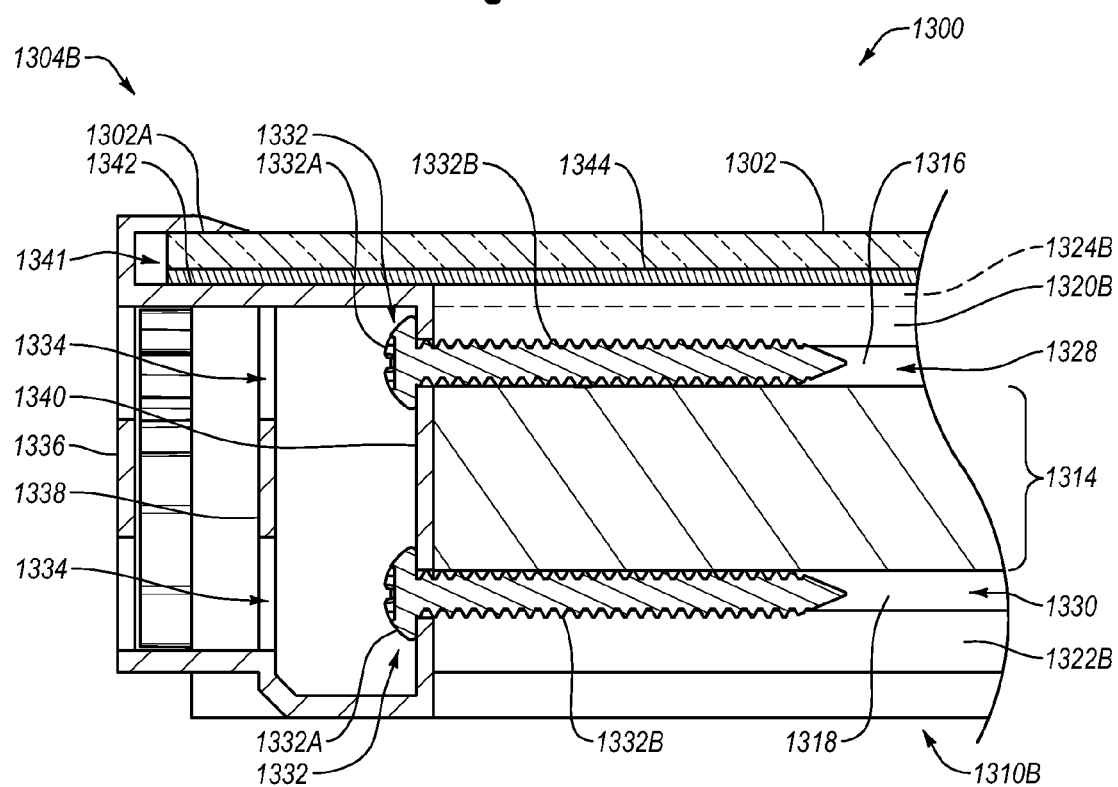
FIG. 13D is a cross-section view of a portion of the reflector of FIG. 13A in cutting plane 13D of FIG. 13A.

FIG. 13D is a cross-sectional view of the reflector 1300 of FIG. 13A in cutting plane 13D illustrated in FIG. 13A. The cross-sectional view of the support member 1310B is in a plane normal to a length of the side member 1304B. FIG. 13D illustrates an example of how the support member 1310B and the side member 1304B can be coupled together. The support member 1310B and the side member 1304A can be coupled together in a similar manner. Additionally, the support member 1310A can be coupled together with each of the side members 1304A and 1304B in a similar manner. FIG. 13D additionally illustrates an example of how the reflective sheet 1302 can be coupled to the side member 1304B and the support member 1310B, with the understanding that the reflective sheet 1302 can be similarly coupled to the side member 1304A and the support member 1310A.

In more detail, FIG. 13D illustrates that the frame of the reflector 1300 in some embodiments includes multiple pan head screws 1332 that couple the side member 1304B and the support member 1310B together. Each pan head screw 1332 includes a head 1332A and a threaded shaft 1332B. Each pan head screw 1332 is inserted completely through two oversized and axially aligned holes 1334 defined in an outer wall 1336 and a common wall 1338 of the side member 1304B. The threaded shaft 1332B of each pan head screw 1332 is inserted through a corresponding hole (not labeled) defined in an inner wall 1340 of the side member 1304B, the head 1332A of each pan head screw 1332 preventing the pan head screws 1332 from passing completely through the inner wall 1340.

The threaded shaft 1332B of each pan head screw 1332 is threaded into a corresponding semi-circular cavity 1328, 1330 of the support member 1310B until the head 1332A of the pan screw 1332 rests again an inside surface of the inner wall 1340 and an end of the support member 1310B is retained against an outside surface of the inner wall 1340.

As illustrated in FIG. 13D, a lengthwise edge 1302A of the reflective sheet 1302 may be received within a slot 1341 defined in the side member 1304B to couple the side member 1304B and the reflective sheet 1302 together. Alternately or additionally, an adhesive may be provided between a flat surface 1342 of the side member 1304B and a back side of the reflective sheet 1302, such as adhesive 1344. Moreover, and as shown in FIG. 13D, a gap may be provided between the edge 1302 of the reflective sheet 1302 and the slot 1341 wall to accommodate thermal expansion of the reflective sheet 1302. The gap may about 1 millimeter (mm) in some embodiments.

Alternately or additionally, the adhesive 1344 may be positioned between the first foot pair 1324 of the support member 1310B and a back side of the reflective sheet 1302. Only one foot 1324B of the first foot pair 1324 is called out in FIG. 13D. The adhesive 1344 may be configured to couple the support member 1310B to the back side of the reflective sheet 1302. The adhesive 1344 may include acrylic foam tape or other suitable adhesive. Adhesively coupling the reflective sheet 1302 to the support member 1310B may help maintain squareness and flatness of the reflector 1300.

As previously mentioned with respect to the side member 700 of FIG. 7A, the slot 714 can be omitted and the side member 700 can be coupled to a reflective sheet by applying an adhesive between the back side of the reflective sheet and the flat surface 712. Similarly, the slot 1341, including the structure of the side member 1304B that defines the slot 1341, can be omitted and the adhesive 1344 can be applied to the flat surface 1342 to couple the side member 1304B and the reflective sheet 1302 together. In these and other embodiments, the reflector 1300 can be assembled in the field at an installation location or elsewhere.

Additional details regarding the reflective sheet 1302 in accordance with at least some embodiments will now be described. As previously mentioned, the reflective sheet 1302 has a reflectance spectrum of wavelengths of light that are reflected by the reflective sheet 1302. The reflective sheet 1302 may additionally have a transmittance spectrum including at least some predetermined wavelengths of visible light, and the transmittance spectrum may depend on the incidence angle of the light. The predetermined wavelengths of visible light within the transmittance spectrum of the reflective sheet 1302 may be selected from wavelengths of light that are outside an absorption band of the PV modules with which the reflector 1300 is implemented, and may include blue light, for example, or more generally light having wavelengths of about 400-600 nanometers (nm) for certain incident angles. Thus, transmitting these wavelengths of visible light through the reflective sheet 1302 rather than reflecting them onto a PV module positioned opposite the reflector 1300 may have a negligible affect on the efficiency of the PV module.

Alternately or additionally, the transmittance spectrum of the reflective sheet 1302 may depend on the incidence angle of incoming light. For instance, the transmittance spectrum of the reflective sheet 1302 may range from 400-650 nm and greater than 1100 nm at an incidence angle normal to the reflective sheet 1302. For an incidence angle of 30 degrees (e.g., 60 degrees from a normal to the reflective sheet 1302), the transmittance spectrum may range from 300-500 nm and above 1000 nm. In the early AM and late PM daylight hours, the incidence angle is typically greater than around solar noon, which may result in a downward wavelength shift of both the transmittance spectrum and reflectance spectrum of the reflective sheet 1302 in the early AM and late PM daylight hours (e.g., more efficient reflection properties in the early AM and late PM hours when temperatures are typically lower than at solar noon. Accordingly, the reflective sheet 1302 may transmit shorter wavelengths in the early AM and late PM daylight hours, and relatively longer wavelengths near solar noon.

Accordingly, the reflector 1300 in some embodiments may function as a skylight, at least for the predetermined wavelengths of visible light, when installed in a solar energy system as an overhead structure provided above a particular space, such as a carport. In these and other embodiments, natural lighting having the predetermined wavelengths that is incident on the reflective sheet 1302 may be transmitted through the reflective sheet 1302 and illuminate the particular space therebeneath.

In some embodiments, the reflective sheet 1302 includes a glass substrate or other transparent substrate, and a spectroscopic film formed directly on the glass substrate. The spectroscopic film may include a stack of dielectric layers built up in an alternating fashion of approximately ¼ wavelength thick layers with alternating refractive indexes. The reflectance and transmittance spectra of the reflective sheet 1302 may depend on, for instance, the exact thickness of the dielectric layers in the spectroscopic film and/or the refractive index of each dielectric layer. The spectroscopic film may be formed on the substrate by DC sputtering, reactive sputtering, hybrid sputtering methods, chemical vapor deposition (CVD), physical vapor deposition (PVD), atomic layer deposition (ALD), plasma-enhanced CVD (PE-CVD) or other suitable deposition process that in some embodiments may use combinations of one or more of $SiO_2$, $TiO_2$, $WO_2$, $NiO_2$, or other transparent oxides.

Figure 14:
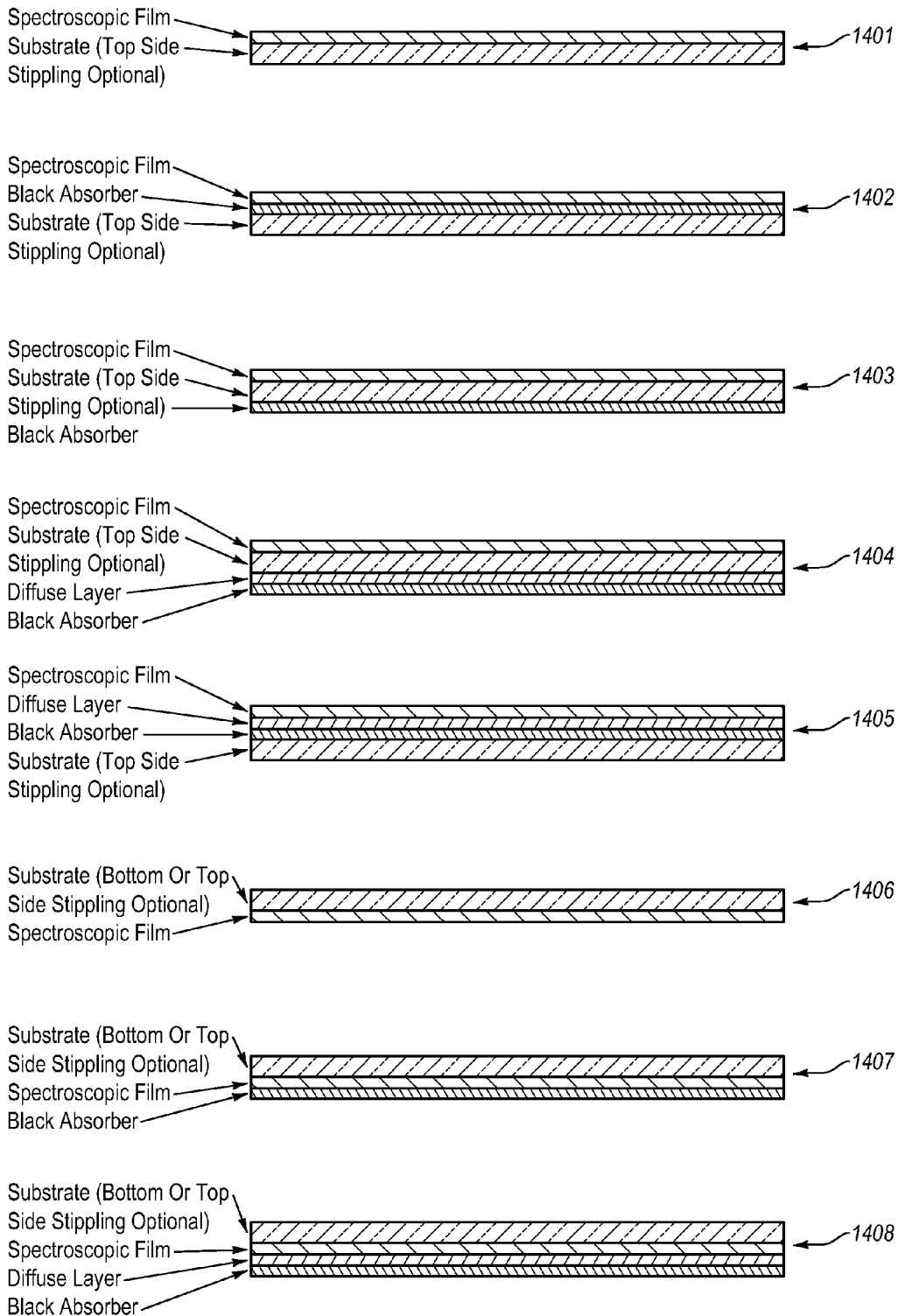
FIG. 14 illustrates various material stacks that can be implemented in a reflective sheet included in the reflector of FIG. 13A.

FIG. 14 illustrates various material stacks 1401-1408 that can be implemented for the reflective sheet 1302. For instance, the reflective sheet 1302 can include a spectroscopic film formed directly on a top surface of the substrate as in material stacks 1401, 1403 and 1404, or formed directly on a bottom surface of the substrate as in material stacks 1406-1408.

Optionally, a top and/or bottom surface of the substrate in material stacks 1401-1408 may have a stipple pattern formed thereon such that light reflected from the reflective sheet 1302 including the corresponding material stack 1401-1408 is non-concentrating and diffuse. Alternately or additionally, the reflective sheet 1302 can include a black absorbing layer as in material stacks 1402-1405 and 1407-1408, a diffuse reflecting layer as in material stacks 1404-1405 and 1408, and/or an aluminum layer on a bottom side of the material stack for crowning the reflective sheet 1302. The black absorbing layer, diffuse reflecting layer and/or aluminum layer may be laminated together with the substrate and spectroscopic layer in some embodiments. The black absorbing layer may absorb some or all of the transmittance spectrum of the reflective sheet 1302 to prevent the transmittance spectrum from passing beneath the reflector sheet 1302 and heating a region near the backside of the reflector 1300. The diffuse reflecting layer may act to re-reflect unusable wavelengths of light back into the sky.

Some aspects of stipple patterns, black absorbing layers, diffuse reflecting layers and crowned reflectors are disclosed in U.S. patent application Ser. No. 12/711,040 which was previously incorporated by reference. Those skilled in the art will recognize, with the benefit of the present disclosure, that the aspects disclosed therein can be analogously applied to the material stacks 1401-1408 of FIG. 14.

Rather than crowning the reflective sheet 1302 by including an aluminum layer on the bottom side of the material stack, the reflective sheet 1302 may instead be crowned by using side members 1304A, 1304B and/or support members 1310A, 1310B that have a slight out-of-plane curvature, e.g., out of the plane of the reflective sheet 1302. For instance, a radius of curvature of the side members 1304A, 1304B and/or support members 1310A, 1310B may be in a range from 1000-2000 feet, or less than 1000 feet or greater than 2000 feet. The curvature may be imparted to the side members 1304A, 1304B and/or support members 1310A, 1310B during extrusion thereof, or post extrusion.

Optionally, the reflective sheet 1302 can include a layer patterned with a laser, where the patterning includes externally visible advertising information. For instance, the laser can partially melt the spectroscopic film or diffuse reflecting layer to create patterning in the reflective sheet 1302 where the reflectance spectrum is different for the patterning than the rest of the reflective sheet 1302. In this manner, advertising information can be embedded in the reflective sheet 1302 as a "written" image.

VII. Vertical Installations

Figure 15:
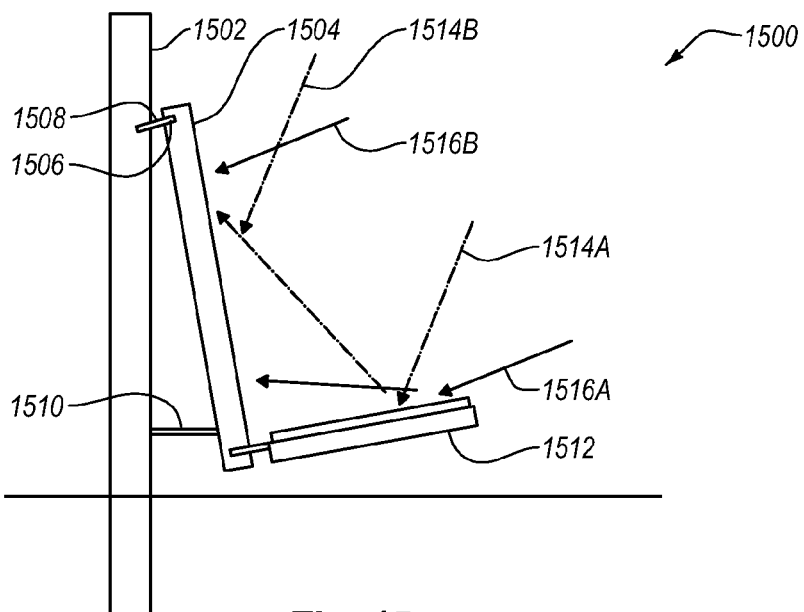
FIG. 15 is a side view of a solar energy system installed on a vertical installation surface.

FIG. 15 is a side view of a solar energy system 1500 installed on a vertical installation surface 1502, arranged in accordance with at least some embodiments described herein. The vertical installation surface 1502 may be on, for instance, a wall—e.g., on a house, building, or the like—a fence, or other generally vertical structure.

In general, the solar energy system 1500 includes at least a PV module 1504 and a rod 1506 configured to couple the PV module 1504 to the vertical installation surface 1502. The PV module 1504 may be an illumination agnostic PV module as described above. Additionally, the PV module 1504 includes a frame in some embodiments that is implemented as described above with respect to FIGS. 7A-9. For instance, the frame of the PV module 1504 may include two side members and top and bottom members, where each side member (and possibly the top and/or bottom members) has an extruded single-wall-box construction, is configured to receive in a top and/or bottom end thereof an insert, such as the insert 800 of FIGS. 8-9 described above, and the like.

In these and other embodiments, the frame may be provided along a perimeter of the PV module 1504 with the side members of the frame being positioned on opposing sides of the PV module 1504. Further, each side member may have a top end and a bottom end that respectively extend beyond a top edge and a bottom edge of the PV module 1504. A hole, L-shaped slot, J-shaped slot, or the like can be defined in the top and/or bottom end of each of the side members and can be used alone or in connection with an insert as described above with respect to FIGS. 7A-9 for connecting the PV module 1504 to the vertical installation surface 1502 and/or for connecting other components to the PV module 1504.

In FIG. 15, the rod 1506 is normal to the viewing angle and may be received through the slot in the top end of each of the two side members of the PV module's 1504 frame. The rod in some embodiments is coupled to the vertical installation surface 1502 by anchors 1508 and couples the PV module 1504 to the vertical installation surface 1502.

Optionally, one or more bottom supports 1510 are provided. In the illustrated embodiment, the one or more bottom supports 1510 extends from the vertical installation surface 1502 against a bottom portion of the PV module 1504. The one or more bottom supports 1510 support the PV module 1504 at an angle relative to the vertical installation surface.

The solar energy system 1500 of FIG. 15 may further include a base reflector 1512 attached to the bottom of the PV module 1504 that is generally configured to reflect at least some wavelengths of light onto the PV module 1504. For instance, FIG. 18 illustrates two extreme cases of the base reflector 1512 reflecting both summer and winter light 1514A, 1516A onto the PV module 1504. Of course, the PV module 1504 can also directly receive summer and winter light 1514B, 1516B, respectively.

Optionally, the base reflector 1512 may be rotatably coupled to the bottom of the PV module 1504. In these and other embodiments, the relative position of the base reflector 1512 may be adjusted two or more times per year for seasonal changes as described above with respect to FIGS. 10A-11B.

Alternately or additionally, the base reflector 1512 may be rotated counterclockwise in FIG. 15 towards the PV module 1504 and out of the way on a short-term basis, such as during a backyard event if the solar energy system 1500 were installed in somebody's backyard.

Figure 16A:
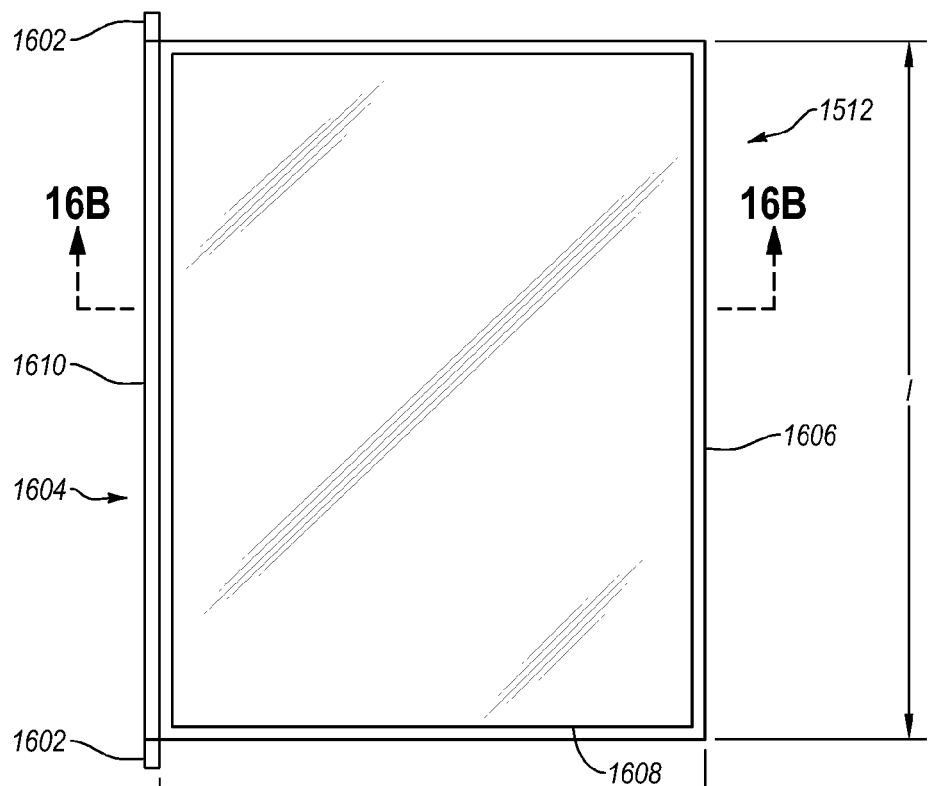
FIG. 16A illustrates an example of a base reflector included in the solar energy system of FIG. 15.

FIG. 16A illustrates an example of the base reflector 1512 in accordance with at least some embodiments. As shown, the base reflector 1512 includes two protrusions 1602 on opposing ends of the same edge 1604 of the base reflector 1512. Each of the two protrusions 1602 may extend into a hole or slot in the bottom end of each of the two side members of the PV module 1504 frame to couple the base reflector 1512 to the PV module 1504.

Figure 16B:
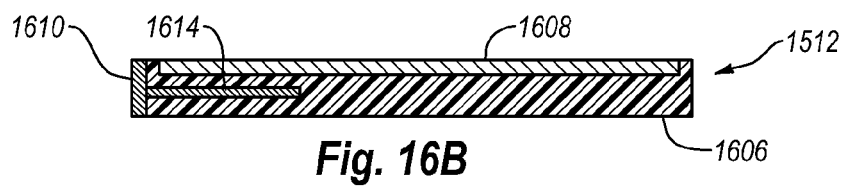
FIG. 16B is a cross-sectional view of the base reflector of FIG. 16A in cutting plane 16B illustrated in FIG. 16A.

FIG. 16B is a cross-sectional view of the base reflector 1512 in cutting plane 16B illustrated in FIG. 16A. In some embodiments, and as illustrated in FIGS. 16A-16B, the base reflector 1512 includes a rigid or semi-rigid layer 1606 and a reflective layer 1608 configured to reflect light having wavelengths within a reflectance spectrum of the reflective layer 1608. Alternately or additionally, the base reflector 1512 further includes a metallic stiffener 1610.

The rigid or semi-rigid layer 1606 may include, but is not limited to, expanded polyethylene, UV-stabilized polyethylene, or the like or any combination thereof. Optionally, a thickness of the rigid or semi-rigid layer 1606 is in a range from one to three inches, or the thickness of the rigid or semi-rigid layer 1606 may be greater than three inches or less than one inch. The rigid or semi-rigid layer 1606 structurally supports and holds the base reflector 1512 in place relative to the PV module 1504. Additionally, depending on the material used for the rigid or semi-rigid layer 1606, the exposed corners of the base reflector 1512 may be less sharp and/or otherwise less likely to injure passersby than a base reflector with a metallic frame along its perimeter, for instance. Alternately or additionally, the base reflector 1512 may be rotated upward toward the PV module 1504 as noted above, and/or removed at times if the space occupied by the base reflector 1512 in the configuration shown in FIG. 15 is needed.

The reflective layer 1608 in some embodiments includes a spectroscopic film with stacked dielectric layers as described hereinabove, or some other reflective film that is reflective with respect to at least some wavelengths of light. A reflectance spectrum of the reflective layer 1608 may include, for example, infrared (IR) or near-IR wavelengths, and/or other wavelengths of light.

As best seen in FIG. 16B, the reflective layer 1608 may be recessed within the rigid or semi-rigid layer 1606 such that a top surface of the reflective layer 1608 is substantially flush with a top surface of the rigid or semi-rigid layer 1606 around the perimeter of the reflective layer 1608. Alternately or additionally, the rigid or semi-rigid layer 1606 may include a lip that extends up and over a portion of the reflective layer 1608 along one or more of the edges of the reflective layer 1608. Recessing the reflective layer 1608 within the rigid or semi-rigid layer 1606 and/or providing an overlapping lip may prevent or reduce the likelihood of delamination of the reflective layer 1608 from the rigid or semi-rigid layer 1606.

The metallic stiffener 1610 in some embodiments is made of metal or other material(s) and has the two protrusions 1602 integrally formed on opposing ends thereof. As illustrated, the metallic stiffener 1610 further includes a base 1612 and a cantilever 1614 extending from the base 1612 into the rigid or semi-rigid layer 1606. The base 1612 is configured to stiffen the base reflector 1512 in a direction of the length of the base reflector 1512 and the cantilever 1614 is configured to stiffen the base reflector 1512 in a direction of the width w of the base reflector 1512.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A solar energy system, comprising:
a plurality of photovoltaic modules;
a plurality of reflectors, each of the plurality of reflectors positioned opposite a corresponding one of the plurality of photovoltaic modules; and
a racking assembly mechanically interconnecting the plurality of photovoltaic modules and the plurality of reflectors to form an interconnected system;
wherein:
the photovoltaic modules and reflectors are arranged in adjacent rows;
the adjacent rows include reflector rows interposed between module rows;
each reflector row includes multiple reflectors;
each module row includes multiple photovoltaic modules;
the racking assembly defines gaps within the racking assembly and between adjacent photovoltaic modules and reflectors, the gaps between adjacent photovoltaic modules and reflectors including a module-to-module gap between the adjacent photovoltaic modules within each module row and a reflector-to-reflector gap between the adjacent reflectors within each reflector row;
the interconnected system includes a plurality of contact points associated with the gaps;
the racking assembly comprises:
a plurality of rails arranged orthogonally to and beneath the adjacent rows; and
a plurality of fins that interconnect the photovoltaic modules and the reflectors to the rails; and
the fins define the module-to-module gap between the adjacent photovoltaic modules within each module row and the reflector-to-reflector gap between the adjacent reflectors within each reflector row.

2. The solar energy system of claim 1, wherein the interconnected system has a nonlinear resistive force versus displacement profile.

3. The solar energy system of claim 1, wherein:
each photovoltaic module and each reflector has two lower corners, each lower corner being connected to the racking assembly through a corresponding fin;
each photovoltaic module has two upper corners, each connected to a respective one of two upper corners of a corresponding reflector positioned behind the photovoltaic module; and
adjacent lower corners of adjacent photovoltaic modules within each module row and of adjacent reflectors within each reflector row are connected to each other through a corresponding one of the fins.

4. The solar energy system of claim 3, wherein:
sides of each of the adjacent photovoltaic modules and adjacent reflectors on opposing sides of each module-to-module gap or reflector-to-reflector gap include the contact points associated with the module-to-module gap or reflector-to-reflector gap;
each rail has a top defining a longitudinal channel;

each fin has a base received within the longitudinal channel;
a longitudinal gap is defined between the base of each fin and a bottom of the longitudinal channel of each rail;
a bottom of each longitudinal channel and a bottom of each base include contact points associated with each longitudinal gap.

5. The solar energy system of claim 4, wherein:
the plurality of rails includes a plurality of rail columns;
within each rail column, multiple rails are longitudinally aligned and connected end-to-end to each other;
a rail-to-rail gap is defined between adjacent longitudinally-connected rails; and
ends of adjacent longitudinally-connected rails on opposing sides of each rail-to-rail gap include contact points associated with each rail-to-rail gap.

6. The solar energy system of claim 5, wherein one or more of the module-to-module gaps, reflector-to-reflector gaps, longitudinal gaps or rail-to-rail gaps allow the components of the interconnected system to accommodate in-plane and out-of-plane displacement relative to one another until the contact points associated with a corresponding module-to-module gap, reflector-to-reflector-gap, longitudinal gap or rail-to-rail gap come in contact with each other; wherein a stiffness of the interconnected system is much greater when the contact points are in contact with each other than when the contact points are not in contact with each other.

7. The solar energy system of claim 1, wherein the racking assembly further comprises a plurality of compliant pads, each compliant pad being positioned between a rail and the installation surface, wherein a coefficient of friction between the compliant pads and the installation surface is greater than a coefficient of friction between the rails and the installation surface.

8. The solar energy system of claim 7, wherein each of the compliant pads comprises expanded polyethylene having a thickness in a range of 0.5 inches to 2 inches.

9. The solar energy system of claim 8, wherein each of the compliant pads further comprises a bottom layer including at least one of butyl rubber, ethylene propylene diene Monomer (EPDM) rubber, or polyurethane adhesive, the bottom layer having a thickness in a range of 0.05 to 0.5 inches.

10. The solar energy system of claim 7, wherein each of the compliant pads comprises ethylene propylene diene Monomor (EPDM) rubber having a thickness in a range of 0.1 inches to 1 inch.

11. The solar energy system of claim 1, wherein the racking assembly is configured to permit individual removal or positional adjustment of any one of the photovoltaic modules or reflectors without removing or otherwise supporting any of the other photovoltaic modules or reflectors during the removal or positional adjustment.

12. The solar energy system of claim 11, wherein the reflectors are configured to be individually adjusted at least twice annually between a first position and a second position, the reflectors being positioned at a first angle relative to horizontal in the first position and a second angle relative to horizontal in the second position, the second angle being different than the first angle.

13. The solar energy system of claim 12, wherein:
each photovoltaic module has two upper corners, each connected to a respective one of two upper corners of a corresponding reflector positioned behind the photovoltaic module such that each corresponding reflector can rotate, relative to the photovoltaic module, about a first axis of rotation that is parallel to a top edge of the photovoltaic module and to a top edge of the corresponding reflector;
each lower corner of each photovoltaic module is coupled to a corresponding fin;
each lower corner of each reflector is coupled through a corresponding connector to the same fin as the corresponding lower corner of the photovoltaic module positioned opposite the reflector; and
at least one of:
each fin defines a slot in which a corresponding connector can travel between a first endpoint corresponding to the first position and a second endpoint corresponding to the second position, a corresponding reflector rotating about a corresponding first axis of rotation when the corresponding connector travels between corresponding first and second endpoints in a slot of a corresponding fin;
each connector is configured to support a bottom edge of a corresponding reflector at a first predetermined location relative to a corresponding fin when in the first position and at a second predetermined location relative to the corresponding fin when in the second position, wherein the first and second predetermined locations are configured to prevent the corresponding fin from shadowing the corresponding reflector in morning or afternoon lighting conditions; or
each connector is rotatably coupled to a corresponding fin and is rotatable between a first connector position in which the connector is configured to support a corresponding reflector in the first position, and a second connector position in which the connector is configured to support the corresponding reflector in the second position.

14. The solar energy system of claim 1, wherein a length of each rail is in a range between 15 and 30 feet.

15. A solar energy system comprising:
a plurality of photovoltaic modules;
a plurality of reflectors, each of the plurality of reflectors positioned opposite a corresponding one of the plurality of photovoltaic modules;
a racking assembly comprising a plurality or rails mechanically interconnecting the plurality of photovoltaic modules and the plurality of reflectors to form an interconnected system; and
a rainwater collection subsystem;
wherein:
the racking assembly defines gaps within the racking assembly and between adjacent photovoltaic modules and reflectors;
the interconnected system includes a plurality of contact points associated with the gaps;
the photovoltaic modules and reflectors are positioned such that top surfaces thereof are at one or more angles relative to horizontal; and
the rainwater collection subsystem comprises:
an extruded drip gutter extending from a bottom edge of each photovoltaic module and of each reflector, the extruded drip gutter configured to collect rainwater that runs down the surface of the corresponding photovoltaic module or reflector and to channel the collected rainwater towards one or both ends of the extruded drip gutter, one or both ends of the extruded drip gutter being open to expel the collected rainwater therefrom;
edge extensions extending upwards from a base of each rail to define rail channels on opposing sides of each rail, the rail channels being positioned beneath ends of the extruded drip gutters such that expelled rainwater is captured in the rail channels; and one or more storage reservoirs in fluid communication with the rail channels, the one or more storage reservoirs being configured to receive and store the rainwater captured by the rail channels.

16. A solar energy system comprising:
a plurality of photovoltaic modules;
a plurality of reflectors, each of the plurality of reflectors positioned opposite a corresponding one of the plurality of photovoltaic modules; and
a racking assembly mechanically interconnecting the plurality of photovoltaic modules and the plurality of reflectors to form an interconnected system;
wherein:
the racking assembly defines gaps within the racking assembly and between adjacent photovoltaic modules and reflectors;
the interconnected system includes a plurality of contact points associated with the gaps;
each of the photovoltaic modules and reflectors includes a frame;
each frame comprises two side members positioned on opposing sides of a corresponding photovoltaic module or reflector;
each side member for each reflector frame has a double-wall-box construction including an inner box aligned lengthwise side-by-side with an outer box along at least most of the length of each side member, one side of each box being a common wall shared between the inner and outer boxes;
each side member for each module frame has a single-wall-box construction;
each side member has a length greater than a length of the corresponding photovoltaic module or reflector and is arranged such that top and bottom ends of each side member respectively extend beyond upper and lower edges of a corresponding photovoltaic module or reflector;
the outer wall box is absent from the top end of each side member in each reflector frame; and
the top end of each of two side members in a frame of each photovoltaic module is removably coupled to the top end of each of two side members in a frame of a corresponding reflector positioned behind the photovoltaic module.

17. The solar energy system of claim 16, wherein:
the side members in each photovoltaic module frame and the racking assembly are electrically conductive; and
the bottom end of each side member in each photovoltaic module frame is mechanically and electrically coupled directly to the racking assembly to provide a direct grounding connecting from each photovoltaic module to the racking assembly.

18. The solar energy system of claim 17, further comprising at least one of:
a plurality of star washers, each star washer positioned between the bottom end of a corresponding side member in a corresponding photovoltaic module frame and a portion of the racking assembly to which the bottom end is attached, each star washer being configured to electrically couple the bottom end of the corresponding side member in the corresponding photovoltaic module frame to the corresponding portion of the racking assembly; or
a plurality of cam locking devices, each configured to mechanically and electrically couple the bottom end of the corresponding side member in the corresponding photovoltaic module frame to the racking assembly.

19. The solar energy system of claim 16, wherein the bottom end of each side member in each reflector frame defines an L-shaped slot, and wherein the top and bottom end of each side member in each module frame defines an L-shaped slot.

20. The solar energy system of claim 19, wherein:
each reflector frame further comprises two plastic inserts, each plastic insert positioned in the outer box at the bottom end of a corresponding side member;
each plastic insert is configured to prevent the outer box of the bottom end of the corresponding side member from being crushed;
the bottom end of the corresponding side member of a corresponding reflector frame is configured to be coupled to a fin of the racking assembly by a corresponding connector; and
each plastic insert is configured to retain the corresponding connector in a particular region of the L-shaped slot such that any loads transferred to or from the corresponding reflector frame through the corresponding connector are transferred directly between the bottom end of the corresponding side member and the corresponding connector.

* * * * *